US011128356B2

(12) United States Patent
Black et al.

(10) Patent No.: US 11,128,356 B2
(45) Date of Patent: *Sep. 21, 2021

(54) MULTIPLE-INPUT MULTIPLE-OUTPUT COMMUNICATION WITH WIRELESS COMMUNICATION DEVICES

(71) Applicant: XCOM Labs, Inc., San Diego, CA (US)

(72) Inventors: Peter John Black, La Jolla, CA (US); Michael Mingxi Fan, San Diego, CA (US); Tamer Adel Kadous, San Diego, CA (US); Matthew Stuart Grob, La Jolla, CA (US)

(73) Assignee: XCOM Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,475

(22) Filed: Jul. 10, 2020

(65) Prior Publication Data

US 2020/0389212 A1    Dec. 10, 2020

Related U.S. Application Data

(63) Continuation of application No. 16/224,528, filed on Dec. 18, 2018, now Pat. No. 10,756,795.

(51) Int. Cl.
*H04B 7/0456* (2017.01)
*H04B 7/0408* (2017.01)
(Continued)

(52) U.S. Cl.
CPC ......... *H04B 7/0486* (2013.01); *H04B 7/0408* (2013.01); *H04W 48/16* (2013.01); *H04W 88/085* (2013.01); *H04W 12/50* (2021.01)

(58) Field of Classification Search
CPC .................................................... H04B 7/0486
(Continued)

(56) References Cited

U.S. PATENT DOCUMENTS

| 5,414,796 A | 5/1995 | Jacobs et al. |
| 5,469,115 A | 11/1995 | Peterzell |

(Continued)

FOREIGN PATENT DOCUMENTS

WO    WO 2012/057547    5/2012

OTHER PUBLICATIONS

3GPP RP-170750, New WID: Further Enhancements to Coordinated Multi-Point (CoMP) Operation for LTE, Mar. 2017.
(Continued)

*Primary Examiner* — Peter G Solinsky
(74) *Attorney, Agent, or Firm* — Knobbe, Martens, Olson & Bear, LLP

(57) ABSTRACT

Aspects of this disclosure relate to pair of wireless communication devices wirelessly communicating with a network system in a coordinated manner. A secondary wireless communication device can wirelessly communicate part of a multiple-input multiple-output (MIMO) transmission associated with a primary wireless communication device (i) with the primary wireless communication device via the peer-to-peer link and (ii) with the network system via a cellular link. The secondary wireless communication device can enable the primary wireless communication device to communicate with the network system at a higher data rate and/or at a higher MIMO rank.

20 Claims, 16 Drawing Sheets

(51) Int. Cl.
*H04W 88/08* (2009.01)
*H04W 48/16* (2009.01)
*H04W 12/00* (2021.01)
*H04W 12/50* (2021.01)

(58) Field of Classification Search
USPC .......................................................... 370/329
See application file for complete search history.

(56) References Cited

U.S. PATENT DOCUMENTS

| | | |
|---|---|---|
| 5,479,475 A | 12/1995 | Grob |
| 5,487,175 A | 1/1996 | Bayley |
| 5,515,177 A | 5/1996 | Propach |
| 5,517,323 A | 5/1996 | Propach |
| 5,539,531 A | 7/1996 | Propach |
| 5,566,000 A | 10/1996 | Propach |
| D375,740 S | 11/1996 | Mergenthaler et al. |
| D375,937 S | 11/1996 | Mergenthaler et al. |
| 5,574,773 A | 11/1996 | Grob |
| D376,804 S | 12/1996 | Mergenthaler et al. |
| 5,590,406 A | 12/1996 | Bayley |
| 5,600,754 A | 2/1997 | Gardner et al. |
| 5,617,060 A | 4/1997 | Wilson |
| 5,657,420 A | 8/1997 | Jacobs et al. |
| 5,663,807 A | 9/1997 | Propach |
| D386,186 S | 11/1997 | Schnetzer et al. |
| 5,737,708 A | 4/1998 | Grob |
| 5,748,104 A | 5/1998 | Argyroudis |
| 5,757,858 A | 5/1998 | Black |
| 5,761,204 A | 6/1998 | Grob |
| 5,778,338 A | 7/1998 | Jacobs et al. |
| 5,781,856 A | 7/1998 | Jacobs et al. |
| 5,784,406 A | 7/1998 | DeJaco et al. |
| 5,844,885 A | 12/1998 | Grob |
| 5,857,147 A | 1/1999 | Gardner et al. |
| 5,864,763 A | 1/1999 | Leung |
| 5,870,431 A | 2/1999 | Easton |
| 5,881,368 A | 3/1999 | Grob |
| 5,884,196 A | 3/1999 | Lekven |
| D407,701 S | 4/1999 | Chintala et al. |
| 5,898,920 A | 4/1999 | Jacobs |
| D409,561 S | 5/1999 | Chintala et al. |
| 5,903,862 A | 5/1999 | Weaver et al. |
| D410,893 S | 6/1999 | Chintala et al. |
| 5,912,882 A | 6/1999 | Yafuso |
| D411,823 S | 7/1999 | Jacobs et al. |
| D412,483 S | 8/1999 | Chintala et al. |
| D413,117 S | 8/1999 | Chintala et al. |
| 5,956,673 A | 9/1999 | Weaver et al. |
| 5,956,683 A | 9/1999 | Jacobs et al. |
| 5,960,362 A | 9/1999 | Grob |
| 5,983,099 A | 11/1999 | Yao |
| 5,983,114 A | 11/1999 | Yao |
| 6,006,108 A | 12/1999 | Black |
| D424,573 S | 5/2000 | Maloney et al. |
| 6,101,397 A | 8/2000 | Grob |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,205,130 B1 | 3/2001 | Dejaco |
| 6,208,858 B1 | 3/2001 | Antonio |
| 6,208,873 B1 | 3/2001 | Black |
| 6,215,779 B1 | 4/2001 | Bender |
| 6,246,885 B1 | 6/2001 | Black |
| 6,285,861 B1 | 9/2001 | Bonaccorso |
| 6,360,093 B1 | 3/2002 | Ross et al. |
| 6,360,100 B1 | 3/2002 | Grob |
| 6,363,102 B1 | 3/2002 | Ling |
| 6,366,779 B1 | 4/2002 | Bender |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| D468,685 S | 1/2003 | Jacobs et al. |
| 6,535,523 B1 | 3/2003 | Karmi |
| 6,535,918 B1 | 3/2003 | Bender |
| 6,556,549 B1 | 4/2003 | Bender |
| 6,560,211 B2 | 5/2003 | Esteves |
| 6,574,211 B2 | 6/2003 | Padovani |
| 6,594,501 B2 | 7/2003 | Black |
| 6,594,628 B1 | 7/2003 | Jacobs et al. |
| 6,633,552 B1 | 10/2003 | Ling |
| 6,636,568 B2 | 10/2003 | Kadous |
| 6,661,833 B1 | 12/2003 | Black |
| 6,665,272 B1 | 12/2003 | Pankaj |
| 6,678,257 B1 | 1/2004 | Vijayan |
| 6,680,925 B2 | 1/2004 | Wu |
| 6,680,926 B2 | 1/2004 | Bender |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,714,526 B2 | 3/2004 | Wei |
| 6,714,780 B1 | 3/2004 | Antonio |
| 6,725,028 B2 | 4/2004 | Bonaccorso |
| 6,738,608 B2 | 5/2004 | Black |
| 6,741,861 B2 | 5/2004 | Bender |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,804,210 B2 | 10/2004 | Bender |
| 6,807,161 B2 | 10/2004 | Bender |
| 6,813,478 B2 | 11/2004 | Glazko |
| 6,850,769 B2 | 2/2005 | Grob |
| 6,873,606 B2 | 3/2005 | Agrawal |
| 6,894,994 B1 | 5/2005 | Grob |
| 6,914,965 B1 | 7/2005 | Grob |
| 6,917,799 B2 | 7/2005 | Ross et al. |
| 6,917,821 B2 | 7/2005 | Kadous |
| 6,920,504 B2 | 7/2005 | Bender |
| 6,928,062 B2 | 8/2005 | Krishnan |
| 6,941,133 B2 | 9/2005 | Jacobs et al. |
| 6,965,613 B2 | 11/2005 | Karmi |
| 6,980,514 B2 | 12/2005 | Grob |
| 6,985,516 B1 | 1/2006 | Easton |
| 6,987,778 B2 | 1/2006 | Sindhushayana |
| 7,010,073 B2 | 3/2006 | Black |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,103,643 B1 | 9/2006 | Jacobs et al. |
| 7,106,782 B2 | 9/2006 | Howard |
| 7,113,792 B2 | 9/2006 | Glazko et al. |
| 7,123,922 B2 | 10/2006 | Chaponniere |
| 7,127,654 B2 | 10/2006 | Jalali |
| 7,127,655 B2 | 10/2006 | Chandhok et al. |
| 7,130,282 B2 | 10/2006 | Black |
| 7,133,437 B2 | 11/2006 | Black |
| 7,145,940 B2 | 12/2006 | Gore |
| 7,146,174 B2 | 12/2006 | Gardner et al. |
| 7,149,264 B2 | 12/2006 | Black |
| 7,155,246 B2 | 12/2006 | Bhushan |
| 7,158,506 B2 | 1/2007 | Jacobs et al. |
| 7,165,099 B2 | 1/2007 | Sprigg et al. |
| 7,167,684 B2 | 1/2007 | Kadous |
| 7,177,351 B2 | 2/2007 | Kadous |
| 7,177,648 B2 | 2/2007 | Attar |
| 7,181,666 B2 | 2/2007 | Grob |
| 7,184,426 B2 | 2/2007 | Padovani |
| 7,184,713 B2 | 2/2007 | Kadous |
| 7,184,954 B1 | 2/2007 | Jacobs et al. |

(56) References Cited

U.S. PATENT DOCUMENTS

| | | |
|---|---|---|
| 7,190,951 B2 | 3/2007 | Jacobs et al. |
| 7,194,041 B2 | 3/2007 | Kadous |
| 7,206,580 B2 | 4/2007 | Black |
| 7,206,598 B2 | 4/2007 | Attar |
| 7,209,517 B2 | 4/2007 | Sindhushayana |
| 7,219,145 B2 | 5/2007 | Chmaytelli et al. |
| 7,228,148 B2 | 6/2007 | Esteves |
| 7,233,794 B2 | 6/2007 | Grob |
| 7,236,535 B2 | 6/2007 | Subramaniam |
| 7,239,622 B2 | 7/2007 | Black |
| 7,239,847 B2 | 7/2007 | Attar |
| 7,248,572 B2 | 7/2007 | Bender |
| 7,251,229 B2 | 7/2007 | Montojo |
| 7,263,382 B2 | 8/2007 | Chandhok et al. |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,324,836 B2 | 1/2008 | Steenstra et al. |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,424,290 B2 | 9/2008 | Jacobs et al. |
| 7,428,269 B2 | 9/2008 | Sampath |
| 7,450,943 B2 | 11/2008 | Black |
| 7,457,639 B2 | 11/2008 | Subramaniam |
| D583,782 S | 12/2008 | Jacobs et al. |
| 7,463,576 B2 | 12/2008 | Krishnan |
| 7,472,396 B2 | 12/2008 | Jacobs et al. |
| 7,477,693 B2 | 1/2009 | Subramaniam |
| 7,483,699 B2 | 1/2009 | Karmi |
| 7,499,427 B2 | 3/2009 | Padovani |
| 7,508,748 B2 | 3/2009 | Kadous |
| 7,525,909 B2 | 4/2009 | Fan |
| 7,539,507 B2 | 5/2009 | Grob |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,576,605 B2 | 8/2009 | Lee et al. |
| 7,580,709 B2 | 8/2009 | Black |
| 7,596,090 B2 | 9/2009 | Black |
| 7,596,098 B2 | 9/2009 | Karmi |
| 7,599,329 B2 | 10/2009 | Karmi |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,630,719 B2 | 12/2009 | Bender |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,684,797 B2 | 3/2010 | Jain et al. |
| 7,693,213 B2 | 4/2010 | Sindhushayana |
| 7,715,356 B2 | 5/2010 | Bender |
| 7,719,991 B2 | 5/2010 | Bhushan |
| 7,729,714 B2 | 6/2010 | Black |
| 7,734,285 B2 | 6/2010 | Chmaytelli et al. |
| 7,738,906 B2 | 6/2010 | Attar |
| 7,742,447 B2 | 6/2010 | Joshi |
| 7,788,092 B2 | 8/2010 | Jacobs et al. |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,844,040 B2 | 11/2010 | Sprigg et al. |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,877,744 B2 | 1/2011 | Jacobs et al. |
| 7,890,144 B2 | 2/2011 | Subramaniam |
| 7,893,873 B2 | 2/2011 | Black |
| 7,903,615 B2 | 3/2011 | Gorokhov |
| 7,907,121 B2 | 3/2011 | Jacobs et al. |
| 7,924,753 B2 | 4/2011 | Attar |
| 7,929,991 B2 | 4/2011 | Jacobs et al. |
| 7,940,663 B2 | 5/2011 | Kadous |
| 7,940,908 B2 | 5/2011 | Sprigg et al. |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,041,302 B2 | 10/2011 | Gardner et al. |
| 8,050,198 B2 | 11/2011 | Bhushan |
| 8,060,129 B2 | 11/2011 | Grob |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |
| 8,094,740 B2 | 1/2012 | Bhushan |
| 8,098,231 B2 | 1/2012 | Jacobs et al. |
| 8,098,767 B2 | 1/2012 | Mirbagheri |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,249,577 B2 | 8/2012 | Chmaytelli et al. |
| 8,274,948 B2 | 9/2012 | Bender |
| 8,301,598 B2 | 10/2012 | Chandhok et al. |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,374,134 B2 | 2/2013 | Wang et al. |
| 8,375,261 B2 | 2/2013 | Shi |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,396,152 B2 | 3/2013 | Attar |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,451,740 B2 | 5/2013 | Sampath |
| 8,451,776 B2 | 5/2013 | Dayal |
| 8,452,011 B2 | 5/2013 | Guo |

(56) References Cited

U.S. PATENT DOCUMENTS

| | | |
|---|---|---|
| 8,457,152 B2 | 6/2013 | Gorokhov |
| 8,462,859 B2 | 6/2013 | Sampath |
| 8,462,950 B2 | 6/2013 | Jacobs |
| 8,472,322 B2 | 6/2013 | Black |
| 8,483,223 B2 | 7/2013 | Black |
| 8,487,478 B2 | 7/2013 | Kirby |
| 8,494,593 B2 | 7/2013 | Black |
| 8,498,192 B2 | 7/2013 | Bhushan |
| 8,514,988 B2 | 8/2013 | Wu |
| 8,537,875 B2 | 9/2013 | Soriaga |
| RE44,577 E | 11/2013 | Yafuso |
| 8,576,760 B2 | 11/2013 | Gorokhov |
| 8,582,621 B2 | 11/2013 | Grob |
| 8,583,137 B2 | 11/2013 | Rezaiifar |
| 8,588,777 B2 | 11/2013 | Grob |
| 8,589,514 B2 | 11/2013 | Duggal et al. |
| 8,594,252 B2 | 11/2013 | Black |
| 8,605,729 B2 | 12/2013 | Dayal |
| 8,605,801 B2 | 12/2013 | Rezaiifar |
| 8,605,880 B2 | 12/2013 | Sprigg et al. |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,611,815 B2 | 12/2013 | Mohammadian |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,635,645 B2 | 1/2014 | Krishnamoorthi |
| 8,638,758 B2 | 1/2014 | Black |
| 8,639,190 B2 | 1/2014 | Gore |
| 8,639,662 B2 | 1/2014 | Chandhok et al. |
| 8,644,396 B2 | 2/2014 | Lee et al. |
| 8,654,705 B2 | 2/2014 | Wang |
| 8,654,715 B2 | 2/2014 | Wang |
| 8,654,868 B2 | 2/2014 | Jacobs et al. |
| 8,655,400 B2 | 2/2014 | Kadous |
| 8,665,880 B2 | 3/2014 | Yavuz |
| 8,676,209 B2 | 3/2014 | Gorokhov |
| 8,687,648 B2 | 4/2014 | Jacobs et al. |
| 8,700,083 B2 | 4/2014 | Yavuz |
| 8,712,461 B2 | 4/2014 | Yavuz |
| 8,712,848 B2 | 4/2014 | Jacobs et al. |
| 8,724,545 B2 | 5/2014 | Dayal |
| 8,724,555 B2 | 5/2014 | Krishnan |
| 8,732,272 B2 | 5/2014 | Deshpande |
| 8,737,538 B2 | 5/2014 | Grob |
| 8,737,911 B2 | 5/2014 | Black |
| 8,737,981 B2 | 5/2014 | Jacobs et al. |
| 8,743,751 B2 | 6/2014 | Li |
| 8,743,758 B1 | 6/2014 | Bhargava et al. |
| 8,743,909 B2 | 6/2014 | Black |
| 8,744,018 B2 | 6/2014 | Chen |
| 8,755,350 B2 | 6/2014 | Grob |
| 8,760,994 B2 | 6/2014 | Wang |
| 8,767,885 B2 | 7/2014 | Sampath |
| 8,773,308 B2 | 7/2014 | Black |
| 8,810,194 B2 | 8/2014 | Kirby |
| 8,818,274 B2 | 8/2014 | Grob |
| D712,881 S | 9/2014 | Shaanan et al. |
| 8,824,979 B2 | 9/2014 | Yavuz |
| 8,825,860 B2 | 9/2014 | Linsky |
| 8,830,934 B2 | 9/2014 | Banister |
| 8,831,156 B2 | 9/2014 | Liang |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,878,393 B2 | 11/2014 | Kirby |
| 8,879,440 B2 | 11/2014 | Guo |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,891,436 B2 | 11/2014 | Zhang |
| 8,892,035 B2 | 11/2014 | Mohammadian |
| 8,897,181 B2 | 11/2014 | Wang |
| 8,897,188 B2 | 11/2014 | Black |
| 8,897,220 B2 | 11/2014 | Kadous |
| 8,897,256 B2 | 11/2014 | Cherian |
| 8,903,021 B2 | 12/2014 | Mantravadi |
| 8,908,496 B2 | 12/2014 | Kadous |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,947,042 B2 | 2/2015 | Kirby et al. |
| 8,948,095 B2 | 2/2015 | Black |
| 8,948,147 B2 | 2/2015 | Zheng |
| 8,954,063 B2 | 2/2015 | Sarkar |
| 8,963,486 B2 | 2/2015 | Kirby |
| 8,966,001 B2 | 2/2015 | Rauber |
| 8,971,461 B2 | 3/2015 | Sampath |
| 8,971,808 B2 | 3/2015 | Talvitie et al. |
| 8,971,811 B2 | 3/2015 | Grob |
| 8,971,823 B2 | 3/2015 | Gore |
| 8,971,884 B2 | 3/2015 | Ahluwalia |
| 8,983,480 B2 | 3/2015 | Rezaiifar |
| 8,995,417 B2 | 3/2015 | Jou |
| 9,001,735 B2 | 4/2015 | Padovani |
| 9,007,942 B2 | 4/2015 | Zhao |
| 9,014,152 B2 | 4/2015 | Jou |
| 9,037,134 B2 | 5/2015 | Grob |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,100,549 B2 | 8/2015 | Jacobs et al. |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,130,407 B2 | 9/2015 | Toncich et al. |
| 9,131,420 B2 | 9/2015 | Rezaiifar |
| 9,136,958 B2 | 9/2015 | Walker |
| 9,136,974 B2 | 9/2015 | Gorokhov |
| 9,137,806 B2 | 9/2015 | Yavuz |
| 9,141,961 B2 | 9/2015 | Rajan et al. |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,148,908 B2 | 9/2015 | Bhargava et al. |
| 9,154,179 B2 | 10/2015 | Gudem |
| 9,154,211 B2 | 10/2015 | Sampath |
| 9,155,106 B2 | 10/2015 | Krishnan |
| 9,155,124 B2 | 10/2015 | Bhargava et al. |
| 9,161,232 B2 | 10/2015 | Linsky |
| 9,161,233 B2 | 10/2015 | Wang |
| 9,166,715 B2 | 10/2015 | Jacobs et al. |
| 9,172,402 B2 | 10/2015 | Gudem |
| 9,172,453 B2 | 10/2015 | Wang |
| 9,177,467 B2 | 11/2015 | Tu |
| 9,178,387 B2 | 11/2015 | Mohammadian et al. |
| 9,178,632 B2 | 11/2015 | Grob |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,191,276 B2 | 11/2015 | Jacobs et al. |
| 9,198,053 B2 | 11/2015 | Edge |
| 9,204,437 B2 | 12/2015 | Smee |
| 9,226,173 B2 | 12/2015 | Sadek |

(56) References Cited

U.S. PATENT DOCUMENTS

| | | |
|---|---|---|
| 9,246,560 B2 | 1/2016 | Sampath |
| 9,247,525 B2 | 1/2016 | Jacobs et al. |
| 9,253,658 B2 | 2/2016 | Sadek |
| 9,264,972 B2 | 2/2016 | Fan |
| D751,928 S | 3/2016 | Shaanan et al. |
| 9,277,564 B2 | 3/2016 | Wang |
| 9,282,462 B2 | 3/2016 | Dayal |
| 9,288,814 B2 | 3/2016 | Yavuz |
| 9,294,932 B2 | 3/2016 | Walker |
| 9,307,544 B2 | 4/2016 | Gore |
| 9,344,973 B2 | 5/2016 | Yavuz |
| 9,358,940 B2 | 6/2016 | Cooper et al. |
| 9,363,006 B2 | 6/2016 | Bhargava et al. |
| 9,363,764 B2 | 6/2016 | Black |
| 9,374,791 B2 | 6/2016 | Yavuz |
| 9,398,602 B2 | 7/2016 | Kadous |
| 9,407,327 B2 | 8/2016 | Kirby |
| 9,408,165 B2 | 8/2016 | Jou |
| 9,408,220 B2 | 8/2016 | Gore |
| 9,414,434 B2 | 8/2016 | Bhargava et al. |
| 9,419,751 B2 | 8/2016 | Sindhushayana |
| 9,428,127 B2 | 8/2016 | Cooper et al. |
| D765,595 S | 9/2016 | Shaanan et al. |
| 9,450,638 B2 | 9/2016 | Yan |
| 9,451,480 B2 | 9/2016 | Huang |
| 9,451,514 B1 | 9/2016 | Michel et al. |
| 9,454,265 B2 | 9/2016 | Wyrwas et al. |
| 9,461,736 B2 | 10/2016 | Bhushan |
| 9,474,075 B2 | 10/2016 | Yavuz |
| 9,483,769 B2 | 11/2016 | Rajan et al. |
| 9,491,722 B2 | 11/2016 | Yavuz |
| 9,497,495 B2 | 11/2016 | Krishnamoorthi |
| 9,503,134 B2 | 11/2016 | Sadek |
| 9,509,452 B2 | 11/2016 | Liang |
| 9,524,502 B2 | 12/2016 | Rajan et al. |
| 9,525,477 B1 | 12/2016 | Wu |
| 9,544,075 B2 | 1/2017 | Altman et al. |
| 9,578,591 B2 | 2/2017 | Bhargava et al. |
| 9,578,649 B2 | 2/2017 | Dayal |
| 9,585,150 B2 | 2/2017 | Marsh |
| 9,585,156 B2 | 2/2017 | Bhattad |
| 9,609,649 B2 | 3/2017 | Fan |
| 9,660,776 B2 | 5/2017 | Kadous |
| 9,667,817 B2 | 5/2017 | Grob |
| 9,673,837 B2 | 6/2017 | Xue |
| 9,716,402 B2 | 7/2017 | Kirby et al. |
| 9,730,227 B2 | 8/2017 | Marsh |
| 9,747,613 B2 | 8/2017 | Rajan et al. |
| 9,750,014 B2 | 8/2017 | Sadek |
| 9,788,361 B2 | 10/2017 | Valliappan |
| 9,793,738 B2 | 10/2017 | Jacobs et al. |
| 9,794,949 B2 | 10/2017 | Bhargava et al. |
| 9,806,791 B2 | 10/2017 | Bhargava et al. |
| 9,819,747 B2 | 11/2017 | Dacosta |
| 9,832,785 B2 | 11/2017 | Kadous |
| 9,860,033 B2 | 1/2018 | Kadous |
| 9,867,194 B2 | 1/2018 | Kadous |
| 9,893,800 B2 | 2/2018 | Wu |
| 9,900,856 B2 | 2/2018 | Wu |
| 9,900,880 B1 | 2/2018 | Fawazhashim et al. |
| 9,924,368 B2 | 3/2018 | Valliappan |
| 9,924,436 B2 | 3/2018 | Grob |
| 9,936,400 B2 | 4/2018 | Lee |
| 9,942,921 B2 | 4/2018 | Bhargava et al. |
| 9,954,399 B2 | 4/2018 | Toncich et al. |
| 9,954,668 B2 | 4/2018 | Lee |
| 9,955,476 B2 | 4/2018 | Black |
| 9,980,090 B2 | 5/2018 | Gujral et al. |
| 9,986,480 B2 | 5/2018 | Ta et al. |
| 9,991,747 B2 | 6/2018 | Toncich et al. |
| 9,991,986 B2 | 6/2018 | Sindhushayana |
| 10,038,999 B2 | 7/2018 | Sprigg et al. |
| 10,044,438 B2 | 8/2018 | Kadous |
| 10,044,459 B2 | 8/2018 | Chendamarai Kannan |
| 10,075,313 B2 | 9/2018 | Black |
| 10,091,789 B2 | 10/2018 | Valliappan |
| 10,136,311 B2 | 11/2018 | Bhargava et al. |
| 10,178,649 B2 | 1/2019 | Liu |
| 10,182,404 B2 | 1/2019 | Prakash |
| 10,201,014 B2 | 2/2019 | Kadous |
| 10,205,505 B2 | 2/2019 | Michel et al. |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 10,292,019 B2 | 5/2019 | Ta et al. |
| 10,360,593 B2 | 7/2019 | Hunter et al. |
| 10,420,161 B1 | 9/2019 | Sava et al. |
| 10,517,027 B2 | 12/2019 | Ta et al. |
| 10,568,139 B2 | 2/2020 | Bhargava et al. |
| 10,756,795 B2 * | 8/2020 | Black .................... H04W 48/16 |
| 10,880,773 B2 | 12/2020 | Huang et al. |
| 2001/0024437 A1 | 9/2001 | Bender |
| 2001/0034762 A1 | 10/2001 | Jacobs et al. |
| 2001/0034763 A1 | 10/2001 | Jacobs et al. |
| 2001/0044736 A1 | 11/2001 | Jacobs et al. |
| 2001/0044741 A1 | 11/2001 | Jacobs et al. |
| 2001/0047408 A1 | 11/2001 | Jacobs et al. |
| 2001/0055391 A1 | 12/2001 | Jacobs |
| 2002/0029166 A1 | 3/2002 | Jacobs et al. |
| 2002/0059418 A1 | 5/2002 | Bird et al. |
| 2002/0072967 A1 | 6/2002 | Jacobs et al. |
| 2002/0173315 A1 | 11/2002 | Chmaytelli |
| 2003/0050832 A1 | 3/2003 | Jacobs et al. |
| 2003/0145119 A1 | 7/2003 | Bender |
| 2003/0149738 A1 | 8/2003 | Jacobs et al. |
| 2004/0039642 A1 | 2/2004 | Jacobs et al. |
| 2004/0039784 A1 | 2/2004 | Jacobs et al. |
| 2004/0054588 A1 | 3/2004 | Jacobs et al. |
| 2004/0110525 A1 | 6/2004 | Black |
| 2004/0121730 A1 | 6/2004 | Kadous |
| 2004/0205151 A1 | 10/2004 | Sprigg et al. |
| 2004/0249708 A1 | 12/2004 | Jacobs et al. |
| 2004/0268216 A1 | 12/2004 | Jacobs et al. |
| 2005/0104857 A1 | 5/2005 | Jacobs et al. |
| 2006/0063569 A1 | 3/2006 | Jacobs et al. |
| 2006/0111920 A1 | 5/2006 | Jacobs et al. |
| 2006/0119356 A1 | 6/2006 | Rabe et al. |
| 2006/0174314 A1 | 8/2006 | Jacobs et al. |
| 2006/0203794 A1 | 9/2006 | Sampath |
| 2006/0223580 A1 | 10/2006 | Antonio et al. |
| 2006/0229089 A1 | 10/2006 | Tokgoz |
| 2007/0005428 A1 | 1/2007 | Jacobs et al. |
| 2007/0005429 A1 | 1/2007 | Jacobs et al. |
| 2007/0038728 A1 | 2/2007 | Jacobs et al. |
| 2007/0041457 A1 | 2/2007 | Kadous |
| 2007/0066232 A1 | 3/2007 | Black |
| 2007/0071147 A1 | 3/2007 | Sampath |
| 2007/0140192 A1 | 6/2007 | Kusmoto et al. |
| 2007/0165738 A1 | 7/2007 | Barriac |
| 2007/0198981 A1 | 8/2007 | Jacobs et al. |
| 2008/0025241 A1 | 1/2008 | Bhushan |
| 2008/0032740 A1 | 2/2008 | Joshi |
| 2008/0112495 A1 | 5/2008 | Gore |
| 2008/0126258 A1 | 5/2008 | Jacobs et al. |
| 2009/0080499 A1 | 3/2009 | Yavuz |
| 2009/0163209 A1 | 6/2009 | Black |
| 2009/0187593 A1 | 7/2009 | Chen et al. |
| 2009/0198608 A1 | 8/2009 | Jain et al. |
| 2009/0307739 A1 | 12/2009 | Dean et al. |
| 2010/0003931 A1 | 1/2010 | Krishnan |
| 2010/0046497 A1 | 2/2010 | Jalali |
| 2010/0057924 A1 | 3/2010 | Rauber |
| 2010/0067422 A1 | 3/2010 | Kadous |
| 2010/0067518 A1 | 3/2010 | Kaufman et al. |
| 2010/0215022 A1 | 8/2010 | Black |
| 2010/0225270 A1 | 9/2010 | Jacobs et al. |
| 2011/0007680 A1 | 1/2011 | Kadous |
| 2011/0007688 A1 | 1/2011 | Veeravalli |
| 2011/0047384 A1 | 2/2011 | Jacobs et al. |
| 2011/0222423 A1 | 9/2011 | Spindola |
| 2011/0256834 A1 | 10/2011 | Dayal |
| 2011/0310858 A1 | 12/2011 | Tokgoz |

(56) References Cited

U.S. PATENT DOCUMENTS

| | | |
|---|---|---|
| 2012/0016947 A1 | 1/2012 | Damola et al. |
| 2012/0057511 A1 | 3/2012 | Sivakumar et al. |
| 2012/0069232 A1 | 3/2012 | Chui |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0213303 A1 | 8/2012 | Kadous |
| 2012/0258706 A1 | 10/2012 | Yu et al. |
| 2013/0027440 A1 | 1/2013 | Martin et al. |
| 2013/0039262 A1 | 2/2013 | Lim et al. |
| 2013/0170440 A1 | 7/2013 | Tavildar et al. |
| 2013/0201959 A1 | 8/2013 | Guo |
| 2013/0214909 A1 | 8/2013 | Meijers et al. |
| 2013/0217333 A1 | 8/2013 | Sprigg et al. |
| 2013/0229990 A1 | 9/2013 | Fan |
| 2013/0235754 A1 | 9/2013 | Lim et al. |
| 2013/0253918 A1 | 9/2013 | Jacobs |
| 2013/0300358 A1 | 11/2013 | Kirby |
| 2013/0335528 A1 | 12/2013 | Vishwanath et al. |
| 2014/0029705 A1 | 1/2014 | Wu |
| 2014/0038645 A1 | 2/2014 | Wu |
| 2014/0051470 A1 | 2/2014 | Patil et al. |
| 2014/0056239 A1 | 2/2014 | Zhang |
| 2014/0071894 A1 | 3/2014 | Kairouz |
| 2014/0071967 A1 | 3/2014 | Velasco |
| 2014/0079155 A1 | 3/2014 | Wang |
| 2014/0089073 A1 | 3/2014 | Jacobs et al. |
| 2014/0133656 A1 | 5/2014 | Wurster et al. |
| 2014/0219117 A1 | 8/2014 | Meshkati |
| 2014/0219194 A1 | 8/2014 | Varoglu et al. |
| 2014/0219243 A1 | 8/2014 | Meshkati |
| 2014/0247779 A1 | 9/2014 | Wei et al. |
| 2014/0247814 A1 | 9/2014 | Zhang |
| 2014/0256340 A1 | 9/2014 | Prakash et al. |
| 2014/0269616 A1 | 9/2014 | Black |
| 2014/0273884 A1 | 9/2014 | Mantravadi |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0065152 A1 | 3/2015 | Sadek |
| 2015/0070323 A1 | 3/2015 | Hong |
| 2015/0071648 A1 | 3/2015 | Hong |
| 2015/0083917 A1 | 3/2015 | Wyrwas et al. |
| 2015/0084928 A1 | 3/2015 | Wyrwas et al. |
| 2015/0084994 A1 | 3/2015 | Wyrwas et al. |
| 2015/0085686 A1 | 3/2015 | Chande |
| 2015/0133184 A1 | 5/2015 | Sadek |
| 2015/0139015 A1 | 5/2015 | Kadous |
| 2015/0163823 A1 | 6/2015 | Sadek |
| 2015/0181299 A1 | 6/2015 | Rauber |
| 2015/0195733 A1 | 7/2015 | Yavuz |
| 2015/0223077 A1 | 8/2015 | Fan |
| 2015/0245273 A1 | 8/2015 | Grob |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2015/0373605 A1 | 12/2015 | Kanamarlapudi et al. |
| 2015/0382190 A1 | 12/2015 | Canoy |
| 2016/0012489 A1 | 1/2016 | Rajan et al. |
| 2016/0037511 A1 | 2/2016 | Vincze et al. |
| 2016/0085440 A1 | 3/2016 | Canoy et al. |
| 2016/0088625 A1 | 3/2016 | Kadous |
| 2016/0095039 A1 | 3/2016 | Valliappan |
| 2016/0095040 A1 | 3/2016 | Valliappan |
| 2016/0128123 A1 | 5/2016 | Li |
| 2016/0128130 A1 | 5/2016 | Sadek |
| 2016/0164573 A1 | 6/2016 | Birk et al. |
| 2016/0219578 A1 | 7/2016 | Lim et al. |
| 2016/0255664 A1 | 9/2016 | Li |
| 2016/0315688 A1 | 10/2016 | Bhargava et al. |
| 2016/0316361 A1 | 10/2016 | Bhargava et al. |
| 2016/0337971 A1 | 11/2016 | Bhargava et al. |
| 2016/0353482 A1 | 12/2016 | Valliappan |
| 2017/0005741 A1 | 1/2017 | Wu |
| 2017/0013658 A1 | 1/2017 | Ta et al. |
| 2017/0019814 A1 | 1/2017 | Determan |
| 2017/0027017 A1 | 1/2017 | Black |
| 2017/0048047 A1 | 2/2017 | Kadous |
| 2017/0048889 A1 | 2/2017 | Kadous |
| 2017/0054488 A1 | 2/2017 | Michel et al. |
| 2017/0055260 A1 | 2/2017 | Valliappan |
| 2017/0055285 A1 | 2/2017 | Valliappan |
| 2017/0055291 A1 | 2/2017 | Gorokhov |
| 2017/0064657 A1 | 3/2017 | Chendamarai Kannan |
| 2017/0064729 A1 | 3/2017 | Sadek |
| 2017/0070847 A1 | 3/2017 | Altman et al. |
| 2017/0076311 A1 | 3/2017 | Rajan et al. |
| 2017/0093545 A1 | 3/2017 | Kadous |
| 2017/0093883 A1 | 3/2017 | Hebron et al. |
| 2017/0094680 A1 | 3/2017 | Patel |
| 2017/0135029 A1 | 5/2017 | Chendamarai Kannan |
| 2017/0142705 A1 | 5/2017 | Chendamarai Kannan |
| 2017/0142713 A1 | 5/2017 | Chendamarai Kannan |
| 2017/0156078 A1 | 6/2017 | Lee et al. |
| 2017/0202022 A1 | 7/2017 | Chendamarai Kannan |
| 2017/0208576 A1 | 7/2017 | Chendamarai Kannan |
| 2017/0222771 A1 | 8/2017 | Chendamarai Kannan |
| 2017/0223651 A1 | 8/2017 | Patel |
| 2017/0223737 A1 | 8/2017 | Patel |
| 2017/0250842 A1 | 8/2017 | Han et al. |
| 2017/0251473 A1 | 8/2017 | Xue |
| 2017/0280382 A1 | 9/2017 | Radulescu |
| 2017/0289761 A1 | 10/2017 | Stojanovski et al. |
| 2017/0311316 A1 | 10/2017 | Chendamarai Kannan |
| 2017/0311343 A1 | 10/2017 | Chendamarai Kannan |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0353874 A1 | 12/2017 | Harrang et al. |
| 2017/0359263 A1 | 12/2017 | Barghi |
| 2017/0359815 A1 | 12/2017 | Chendamarai Kannan |
| 2017/0373807 A1 | 12/2017 | Hessler et al. |
| 2018/0014311 A1 | 1/2018 | Bhargava et al. |
| 2018/0026703 A1 | 1/2018 | Bhargava et al. |
| 2018/0027059 A1 | 1/2018 | Miller |
| 2018/0041917 A1 | 2/2018 | Xi et al. |
| 2018/0042018 A1 | 2/2018 | Bhushan |
| 2018/0048372 A1 | 2/2018 | Sun et al. |
| 2018/0054234 A1 | 2/2018 | Stuckman et al. |
| 2018/0054348 A1 | 2/2018 | Luo |
| 2018/0054382 A1 | 2/2018 | Luo |
| 2018/0054762 A1 | 2/2018 | Kadous |
| 2018/0054780 A1 | 2/2018 | Radulescu |
| 2018/0054783 A1 | 2/2018 | Luo |
| 2018/0054811 A1 | 2/2018 | Luo |
| 2018/0054812 A1 | 2/2018 | Luo |
| 2018/0054830 A1 | 2/2018 | Luo |
| 2018/0054832 A1 | 2/2018 | Luo |
| 2018/0059221 A1 | 3/2018 | Slobodyanyuk |
| 2018/0063799 A1 | 3/2018 | Sadek |
| 2018/0069589 A1 | 3/2018 | Liu |
| 2018/0069594 A1 | 3/2018 | Henry et al. |
| 2018/0069731 A1 | 3/2018 | Henry et al. |
| 2018/0070243 A1 | 3/2018 | Liu |
| 2018/0084430 A1 | 3/2018 | Patel |
| 2018/0098225 A1 | 4/2018 | Damnjanovic |
| 2018/0098335 A1 | 4/2018 | Sun |
| 2018/0103461 A1 | 4/2018 | Sun |
| 2018/0103472 A1 | 4/2018 | Zhang |
| 2018/0109957 A1 | 4/2018 | Fan |
| 2018/0110022 A1 | 4/2018 | Fan |
| 2018/0110063 A1 | 4/2018 | Fan |
| 2018/0115907 A1 | 4/2018 | Damnjanovic |
| 2018/0115933 A1 | 4/2018 | Radulescu |
| 2018/0115973 A1 | 4/2018 | Black |
| 2018/0123859 A1 | 5/2018 | Liu |
| 2018/0124770 A1 | 5/2018 | Yerramalli |
| 2018/0124776 A1 | 5/2018 | Yerramalli |
| 2018/0124777 A1 | 5/2018 | Yerramalli |

(56) References Cited

U.S. PATENT DOCUMENTS

| | | |
|---|---|---|
| 2018/0124789 A1 | 5/2018 | Yerramalli |
| 2018/0124820 A1 | 5/2018 | Sun |
| 2018/0132236 A1 | 5/2018 | Kadous |
| 2018/0139616 A1 | 5/2018 | Khoshnevisan |
| 2018/0139618 A1 | 5/2018 | Yerramalli |
| 2018/0139782 A1 | 5/2018 | Sadek |
| 2018/0146480 A1 | 5/2018 | Chendamarai Kannan |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167968 A1 | 6/2018 | Liu |
| 2018/0175986 A1 | 6/2018 | Chendamarai Kannan |
| 2018/0176946 A1 | 6/2018 | Sun |
| 2018/0198518 A1 | 7/2018 | Wu |
| 2018/0199379 A1 | 7/2018 | Bhargava et al. |
| 2018/0206213 A1 | 7/2018 | Kim et al. |
| 2018/0206252 A1 | 7/2018 | Thangarasa |
| 2018/0213560 A1 | 7/2018 | Naghshvar |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0241494 A1 | 8/2018 | Chendamarai Kannan |
| 2018/0241526 A1 | 8/2018 | Chendamarai Kannan |
| 2018/0242163 A1 | 8/2018 | Patel |
| 2018/0242223 A1 | 8/2018 | Chendamarai Kannan |
| 2018/0242232 A1 | 8/2018 | Chendamarai Kannan |
| 2018/0242277 A1 | 8/2018 | Liu |
| 2018/0242348 A1 | 8/2018 | Chendamarai Kannan |
| 2018/0249380 A1 | 8/2018 | Zhang |
| 2018/0249496 A1 | 8/2018 | Radulescu |
| 2018/0255561 A1 | 9/2018 | Barghi |
| 2018/0255584 A1 | 9/2018 | Sun |
| 2018/0262962 A1 | 9/2018 | Ta et al. |
| 2018/0269962 A1 | 9/2018 | Liu |
| 2018/0278363 A1 | 9/2018 | Bhushan |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0338299 A1 | 11/2018 | Liu |
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0352597 A1 | 12/2018 | Bostick et al. |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376392 A1 | 12/2018 | Wu |
| 2018/0376393 A1 | 12/2018 | Wu |
| 2018/0376503 A1 | 12/2018 | Sun |
| 2019/0007946 A1 | 1/2019 | Yerramalli |
| 2019/0009756 A1 | 1/2019 | Jacobs |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0044648 A1 | 2/2019 | Boudreau et al. |
| 2019/0053048 A1 | 2/2019 | Bhargava et al. |
| 2019/0053064 A1 | 2/2019 | Niu et al. |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075597 A1 | 3/2019 | Yerramalli |
| 2019/0182703 A1 | 6/2019 | Huang et al. |
| 2019/0230513 A1 | 7/2019 | Ang |
| 2019/0253844 A1 | 8/2019 | Ta et al. |
| 2019/0319723 A1 | 10/2019 | Axmon et al. |
| 2020/0059813 A1 | 2/2020 | Park |
| 2020/0145881 A1 | 5/2020 | Mitra et al. |
| 2020/0154475 A1 | 5/2020 | Pao et al. |
| 2020/0195313 A1 | 6/2020 | Black et al. |
| 2020/0195321 A1 | 6/2020 | Black et al. |
| 2020/0195322 A1 | 6/2020 | Black et al. |
| 2020/0195323 A1 | 6/2020 | Black et al. |
| 2020/0213994 A1 | 7/2020 | Feng et al. |
| 2020/0245384 A1 | 7/2020 | Jacobs et al. |

OTHER PUBLICATIONS

3GPP TR 36.741, Study on Further Enhancements to Coordinated Multi-Point (CoMP) Operation for LTE, V14.0.0, Mar. 2017.

Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.

Andrews, et al., Are We Approaching the Fundamental Limits of Wireless Network Densification?, IEEE Communications Magazine, vol. 54, No. 10, pp. 184-190, Oct. 2016.

Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.

Buzzi, et al., Cell-Free Massive MIMO: User-Centric Approach, IEEE Wireless Communications Letters, vol. 6, No. 6, pp. 706-709, Dec. 2017.

Checko, et al., Cloud RAN for Mobile Networks—a Technology Overview, IEEE Communications Surveys & Tutorials, vol. 17, No. 1, Sep. 2014.

Chen, et al., Channel Hardening and Favorable Propagation in Cell-Free Massive MIMO with Stochastic Geometry, version 1, 2017. Available at: http://arxiv.org/abs/1710.00395.

Chen, et al., Channel Hardening and Favorable Propagation in Cell-Free Massive MIMO with Stochastic Geometry, version 2, 2018. Available at: http://arxiv.org/abs/1710.00395.

Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.

Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.

(56) References Cited

OTHER PUBLICATIONS

Gesbert, et al., Multi-cell MIMO Cooperative Networks: A New Look at Interference, IEEE Journal on Selected Areas in Communications, vol. 28, No. 9, pp. 1380-1408, Dec. 2010.
Gilhousen, et al., On the Capacity of a Cellular CDMA system, IEEE Transactions on Vehicular Technology, vol. 40, No. 2, pp. 303-311, May 1991.
Interdonato, et al., How Much Do Downlink Pilots Improve Cell-Free Massive MIMO?, IEEE, 2016, 7 pages.
Larsson, et al., Massive MIMO for Next Generation Wireless Systems, Jan. 2014.
Marzetta, et al., Fundamentals of Massive MIMO, Cambridge University Press, Dec. 2016, Table of Contents.
Nayebi, et al., Precoding and Power Optimization in Cell-Free Massive MIMO Systems, IEEE Transactions on Wireless Communications, vol. 16, No. 7, pp. 4445-4459, Jul. 2017.
Ngo, et al., Cell-Free Massive MIMO Versus Small Cells, IEEE Transactions on Wireless Communications, vol. 16, No. 3, pp. 1834-1850, Mar. 2017.
Ngo, et al., On the Total Energy Efficiency of Cell-Free Massive MIMO, IEEE Transactions on Green Communications and Networking, vol. 2, No. 1, pp. 25-39, Mar. 2018.
Osseiran, et al., 5G Mobile and Wireless Communications Technology, Cambridge University Press, Oct. 2016, Ch. 9, Coordinated multi-point transmission in 5G.
Rohde & Schwarz, LTE Transmission Modes and Beamforming, White Paper, Jul. 2015.
Shamai, et al., Enhancing the Cellular Downlink Capacity via Co-processing at the Transmitting End, Proceedings of IEEE VTC—Spring, vol. 3, 2001, pp. 1745-1749.
Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.
Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.
Wu, et al., Cloud Radio Access Network (C-RAN): A Primer, IEEE Network, vol. 29, No. 1, pp. 35-41, Jan./Feb. 2015.
Wu, et al., Centralized and Distributed Schedulers for Non-Coherent Joint Transmission, Sep. 2018.
Zhou, et al., Distributed Wireless Communication System: A New Architecture for Future Public Wireless Access, IEEE Communications Magazine, vol. 41, No. 3, pp. 108-113, Mar. 2003.
International Search Report dated Apr. 17, 2020 for International Patent Application No. PCT/US2019/066639.
Written Opinion dated Apr. 17, 2020 for International Patent Application No. PCT/US2019/066639.
International Search Report and Written Opinion in International Application No. PCT/US2020/014935, dated Apr. 15, 2020.
Krishnaswamy et al., "COBA: Concurrent Bandwidth Aggregation—A Case Study in Parallel Wireless Communications," Journal of Communications, vol. 7, No. 7, pp. 524-537, 2012.

\* cited by examiner

MULTIPLE-INPUT MULTIPLE-OUTPUT COMMUNICATION WITH WIRELESS COMMUNICATION DEVICES

CROSS REFERENCE TO PRIORITY APPLICATION

This application is a continuation of U.S. patent application Ser. No. 16/224,528, filed Dec. 18, 2018 and titled "USER EQUIPMENT WITH CELLULAR LINK AND PEER-TO-PEER LINK," the disclosure of which is hereby incorporated by reference herein in its entirety and for all purposes.

BACKGROUND

Technical Field

Embodiments of this disclosure relate to wirelessly communicating multiple-input multiple output (MIMO) data.

Description of Related Technology

The types of modern computing devices continues to increase along with the differing and dynamic needs of each device. The wireless communication systems providing services to such devices are facing increasing constraints on resources and demands for quality and quantities of service. In certain multiple-input multiple-output wireless communication systems, a peak data rate and/or rank determined by a number of antennas and/or a number of transmit/receive chains of a user equipment arranged to connect to a network system can limit the rate and/or quality at which data is exchanged. Accordingly, improvements in providing wireless communication services in a multiple-input multiple-output system are desired.

BRIEF DESCRIPTION OF THE DRAWINGS

Embodiments of this disclosure will now be described, by way of non-limiting example, with reference to the accompanying drawings.

SUMMARY OF CERTAIN INVENTIVE ASPECTS

Figure 1:
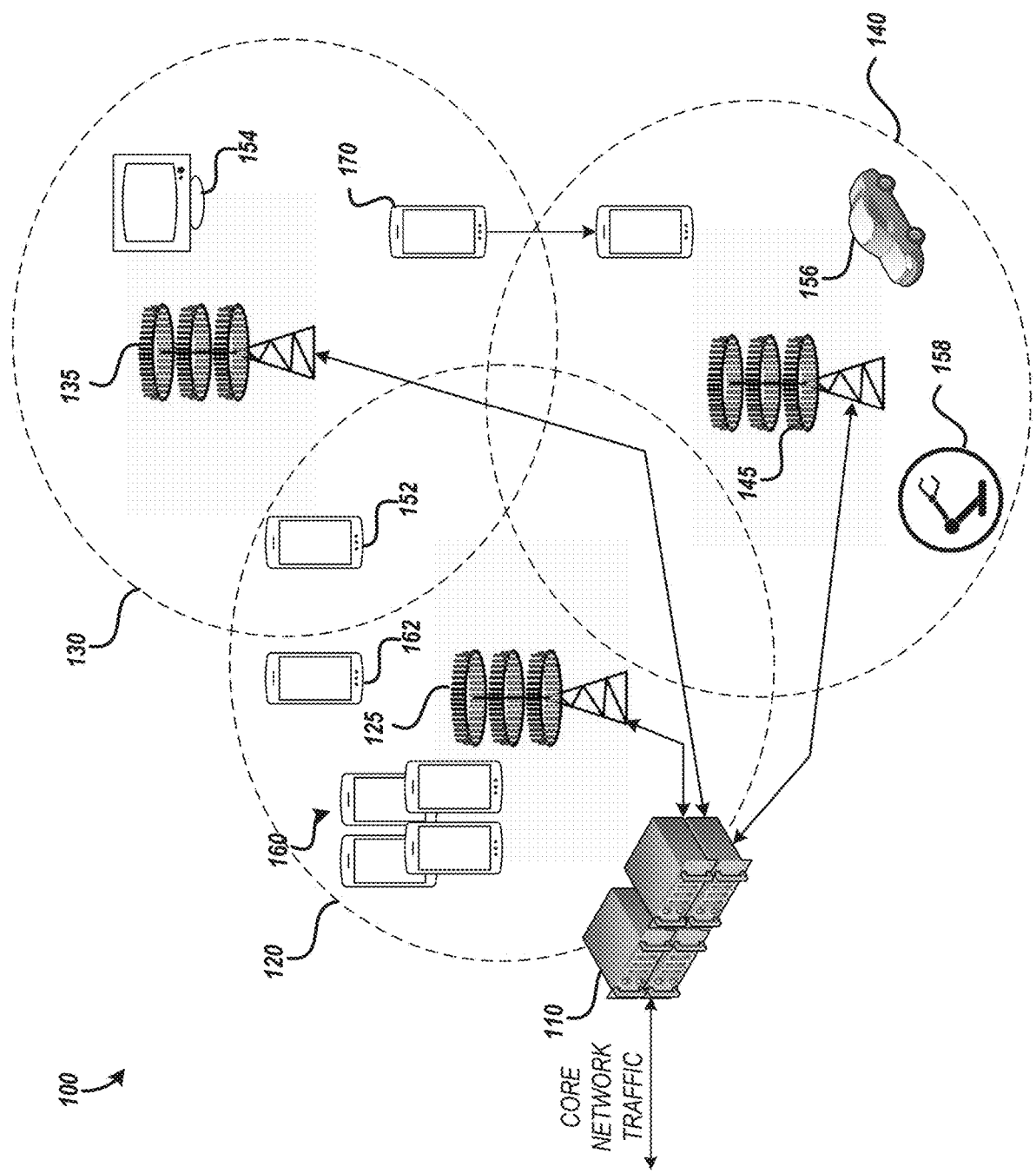
FIG. 1 is a diagram illustrating an example multiple-input multiple-output (MIMO) network in which user equipment (UE) and a network system wirelessly communicate according to an embodiment.

The innovations described in the claims each have several aspects, no single one of which is solely responsible for its desirable attributes. Without limiting the scope of the claims, some prominent features of this disclosure will now be briefly described.

One aspect of this disclosure is a user equipment that includes one or more antennas, a peer-to-peer wireless interface, and a processor in communication with the one or more antennas and the peer-to-peer wireless interface. The one or more antennas are configured to receive a first part of a multiple-input multiple-output (MIMO) downlink data transmission from one or more serving nodes. The peer-to-peer wireless interface is configured to receive a second part of the MIMO downlink data transmission from at least one secondary user equipment. The processor is configured to aggregate the first part of the MIMO downlink data transmission together with the second part of the MIMO downlink data transmission.

Another aspect of this disclosure is a method of receiving a multiple-input multiple-output (MIMO) downlink data. The method includes receiving, using one or more antennas of a primary user equipment, a first part of the MIMO downlink data transmission from one or more serving nodes.

The method also includes receiving, using a peer-to-peer wireless interface, a second part of the MIMO downlink data transmission from at least one secondary user equipment. The method further includes processing, using a processor of the primary user equipment, the first part of the MIMO downlink data transmission together with the second part of the MIMO downlink data transmission.

Another aspect of this disclosure is a user equipment that includes one or more antennas configured to transmit a first part of a multiple-input multiple-output (MIMO) uplink data transmission, a peer-to-peer wireless interface configured to transmit a second part of the MIMO uplink data transmission to at least one secondary user equipment, and a processor in communication with the one or more antennas and the peer-to-peer wireless interface. The processor is configured to cause transmission of the first part of the MIMO uplink data transmission via the one or more antennas and to cause transmission of a second part of the MIMO uplink data transmission via the peer-to-peer wireless interface.

Another aspect of this disclosure is a method of processing downlink data. The method includes establishing a communication channel between a primary user equipment and a secondary user equipment via a peer-to-peer wireless link between the primary user equipment and the secondary user equipment. The method also includes while the primary user equipment is receiving first multiple-input multiple-output (MIMO) downlink data for the primary user equipment via a cellular communication, receiving second MIMO downlink data for the primary user equipment using one or more antennas of the secondary user equipment. The method also includes transmitting the second MIMO downlink data to the primary user equipment via the communication channel.

Another aspect of this disclosure is a user equipment that includes one or more antennas configured to receive a part of a multiple-input multiple-output (MIMO) downlink data transmission, a peer-to-peer wireless interface configured to communicate with a primary user equipment, and a processor in communication with the one or more antennas and the peer-to-peer wireless interface. The processor is configured to receive the part of the MIMO downlink data transmission via the one or more antennas, determine that the part of the MIMO downlink data is associated with the primary user equipment, and cause transmission of symbol level data corresponding to the part of the MIMO downlink data via the peer-to-peer wireless interface to the primary user equipment.

Another aspect of this disclosure is a method of processing uplink data. The method includes establishing a communication channel between a secondary user equipment and a primary user equipment via a peer-to-peer wireless interface of the secondary user equipment. The method also includes while the primary user equipment is transmitting first multiple-input multiple-output (MIMO) uplink data for the primary user equipment to a network system via a cellular communication, receiving, by the secondary user equipment, second MIMO uplink data transmission from the primary user equipment via the communication channel. The method further includes transmitting, using one or more antennas of the secondary user equipment, the second MIMO uplink data to the network system.

Another aspect of this disclosure is a method of processing uplink data. The method includes receiving, by a network system, a first uplink data transmission associated with a primary user equipment from the primary user equipment. The primary user equipment is configured to transmit uplink data at a rate of up to a peak uplink data rate. The method also includes receiving, by the network system, a second uplink data transmission associated with the primary user equipment from a secondary user equipment. The method further includes processing, by the network system, data associated with the first uplink data transmission together with data associated with the second uplink data transmission so as to process uplink data associated with the primary user equipment at a rate of greater than the peak uplink data rate of the primary user equipment.

Another aspect of this disclosure is a method of transmitting downlink data. The method includes generating, by a network system, downlink transmission data for a primary user equipment. The method also includes while the primary user equipment is in communication with a secondary user equipment via a peer-to-peer link: transmitting, by the network system, a first part of the downlink transmission data for the primary user equipment to the primary user equipment; and transmitting, by the network system, a second part of the downlink transmission data for the primary user equipment to the secondary user equipment.

Another aspect of this disclosure is a method of transmitting downlink data. The method includes determining a secondary user equipment to enter a clone mode based on a joint spectral efficiency of a group of user equipments. The group of user equipments includes the secondary user equipment and a primary user equipment. The method includes signaling to the secondary user equipment to enter the clone mode. The method also includes while the secondary user equipment is in the clone mode, transmitting (a) first downlink data for the primary user equipment to the secondary user equipment and (b) second downlink data for the primary user equipment to the primary user equipment.

Another aspect of this disclosure is a method of multiple-input multiple-output (MIMO) wireless communication. The method includes receiving, by a network system, first uplink MIMO data associated with a primary user equipment from the primary user equipment. The method also includes receiving, by the network system, second uplink MIMO data associated with the primary user equipment from a secondary user equipment, wherein the primary user equipment is in communication with the secondary user equipment via a peer-to-peer link. The method further includes aggregating, by the network system, the first uplink MIMO data together with the second uplink MIMO data. In addition, the method includes transmitting, by the network system, downlink data associated with the primary user equipment to a single user equipment via cellular communications.

Another aspect of this disclosure is a method of multiple-input multiple-output (MIMO) wireless communication. The method is performed while a primary user equipment is in communication with a secondary user equipment via a peer-to-peer link. The method includes transmitting, by a network system, a first part of a downlink MIMO data transmission for the primary user equipment to the primary user equipment. The method also includes transmitting, by the network system, a second part of the downlink MIMO data transmission for the primary user equipment to the secondary user equipment. The method further includes receiving, by the network system, uplink data for the primary user equipment from a single user equipment via cellular communications.

The present disclosure relates to U.S. patent application Ser. No. 16/224,643, titled "USER EQUIPMENT CONFIGURED FOR INCREASED DATA RATE," U.S. patent application Ser. No. 16/224,520, titled "METHODS OF WIRELESSLY COMMUNICATING WITH A GROUP OF DEVICES," and U.S. patent application Ser. No. 16/224,568, titled "UNBALANCED WIRELESS COMMUNICATION WITH GROUP OF DEVICES," each filed on Dec. 18, 2018 and the disclosures of each of which are hereby incorporated by reference in their entireties herein.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

DETAILED DESCRIPTION OF CERTAIN EMBODIMENTS

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

In a network that has a relatively large number of transmit and receive antennas at a base station for communicating with user equipment (UE), a peak rate of a given UE can be limited by the multiple-input multiple-output (MIMO) capabilities of the UE. Such MIMO capabilities can include a number of transmit and/or receive chains of the UE and/or a number of antennas of the UE configured to communicate with a network system. For example, if a network system is relatively lightly loaded and has 64×64 transmit and receive chains and a UE has a 2×2 transmit and receive configuration, the UE peak rate can be limited to rank 2 MIMO in both receiving downlink data and transmitting uplink data. Rank can refer to a number of spatial layers available for cellular communications with a UE. Rank is nominally limited by the minimum number of transmit and receive antennas for a link, in this example 2. The rank may be limited by the channel structure, which can further limit the number of spatial layers to less than the antenna limit.

Aspects of this disclosure relate to using a peer-to-peer (P2P) link between a primary UE to a secondary UE in proximity to enable a higher rate data and/or peak data rate for the primary UE. This can enable the primary UE to exchange MIMO data at a higher rank compared to the primary UE communicating with the network system without the P2P link and the secondary UE. The higher effective MIMO order can be achieved with a combination of a cellular link of a primary UE and the primary UE receiving data via the P2P link and a cellular link of the secondary UE. Such a configuration can also enable a primary UE in a heavily congested cell of transmit-receive points (TRPs) to receive traffic from a relatively nearby and less loaded cell of TRPs for higher throughput, upon discovering and establishing a P2P link with a secondary UE in the nearby cell. A variety of methods are disclosed for using a secondary UE to increase the data rate and/or rank associated with data communications between the primary UE and a network system. For example, application routing and aggregation can allow the network system to serve two UEs with a P2P link between them with multi-user MIMO (MU-MIMO). As another example, the UEs with a P2P link between them can form a virtual higher order MIMO transceiver for the primary UE and perform combining at a physical layer through high speed sample transfer between the two UEs. Similar principles and advantages can be applied to transmitting uplink data from the two UEs. Although examples embodiments may be described in terms of a singular secondary UE; any suitable principles and advantages disclosed herein can be applied to cases where two or more secondary UEs are paired with a primary UE.

The technology disclosed herein provides a framework of enabling higher peak rate of a primary UE through a P2P link with a secondary UE for downlink data communications and/or uplink data communications. The mechanisms of achieving a higher peak data rate can be achieved using joint processing at the physical layer and/or aggregation from an application perspective. The mechanism of achieving the higher peak data rate though a higher order physical layer category and MIMO order is also disclosed.

A primary UE and a secondary UE arranged to transmit and/or receive MIMO data associated the primary UE in a coordinated manner can be referred to as a clone pair of UEs. The UEs of the clone pair can each exchange (e.g., transmit and/or receive) MIMO data associated with the primary UE with TRPs. The secondary UE can assist the primary UE in exchanging data with a network. The UEs of the clone pair can also wirelessly communicate with each other over a P2P link. The secondary UE of the clone pair can operate in a clone mode to receive and/or transmit MIMO data associated with the primary UE from and/or to one or more TRPs. In the clone mode, the secondary UE can also wirelessly communicate with the primary UE over the P2P link.

Although embodiments disclosed herein may be discussed with reference to clone pairs of 2 UEs, any suitable principles and advantages discussed herein can be implemented in applications where a group of three or more UEs are arranged to transmit and/or receive MIMO data associated with one of the UEs of the group in a coordinated manner.

A primary UE can discover one or more candidate secondary UEs. The discovery can be performed by the primary UE by itself and/or with assistance of a network system. The candidate secondary UEs can be sufficiently close to the primary UE to establish a P2P link. One or more of the candidate secondary UEs can be idle. In response to discovery, a P2P link can be established between the primary UE and a secondary UE. Data from the primary UE can be transmitted to the secondary UE via the P2P link. Subsequent data transmission to and reception from a network system can be performed, for example, via MU-MIMO and application layer aggregation. As another example, subsequent data transmission to and reception from a network system can be performed via a time-coordinated single-user MIMO (SU-MIMO) though a higher order UE category and higher order data rate request though the primary UE jointly using the TRP information of the secondary UE.

As an example of the technology described herein, a primary UE with 2 receive chains and 2 transmit chains can communicate with a 4×4 cell site with a peak data rate similar to 4×4 MIMO. The primary UE can be active and achieve a data rate corresponding to 2×2 MIMO operating by itself. A secondary UE can be discovered and a P2P link can be established between the primary UE and the secondary UE. By communicating with a network system using hardware of both the primary UE and the secondary UE, the primary UE can achieve a data rate similar to 4×4 MIMO.

Figure 2A:
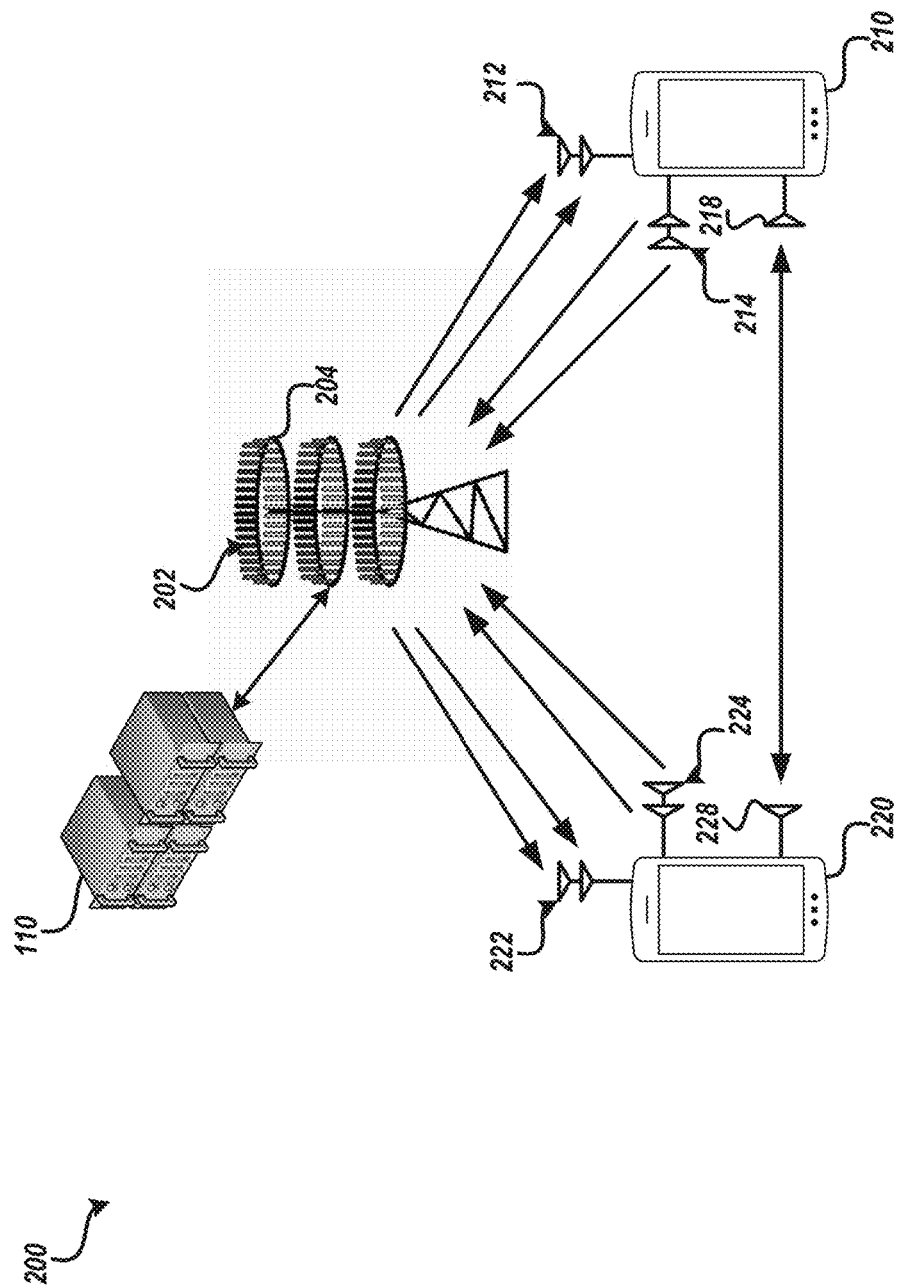
FIG. 2A is a diagram illustrating coordinated transmission and reception of MIMO data for one UE by a pair of UEs communicating via a peer-to-peer (P2P) link according to an embodiment.
Figure 2B:
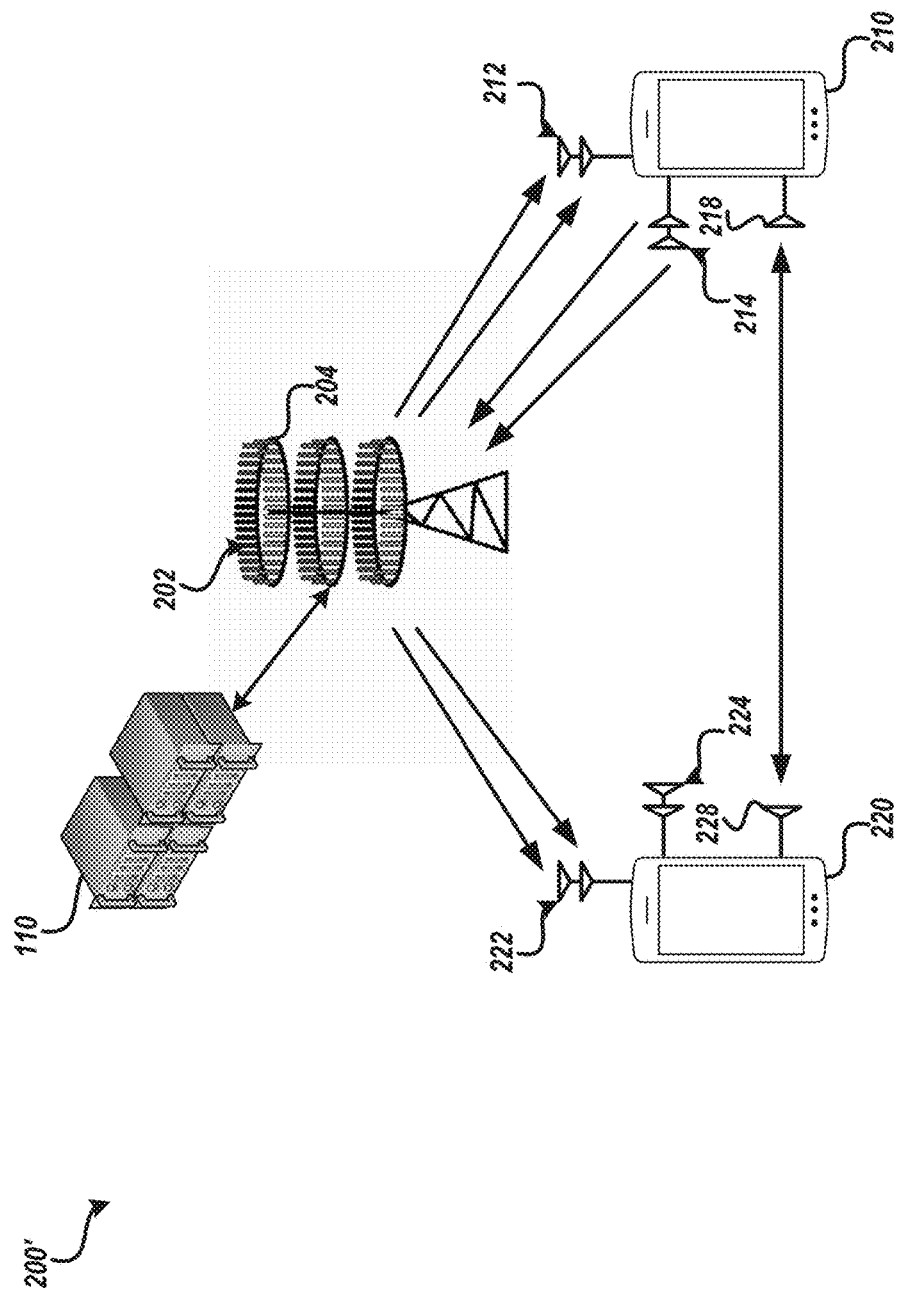
FIG. 2B is a diagram illustrating coordinated reception of MIMO data for one UE by a pair of UEs communicating via a P2P link according to an embodiment.
Figure 2C:
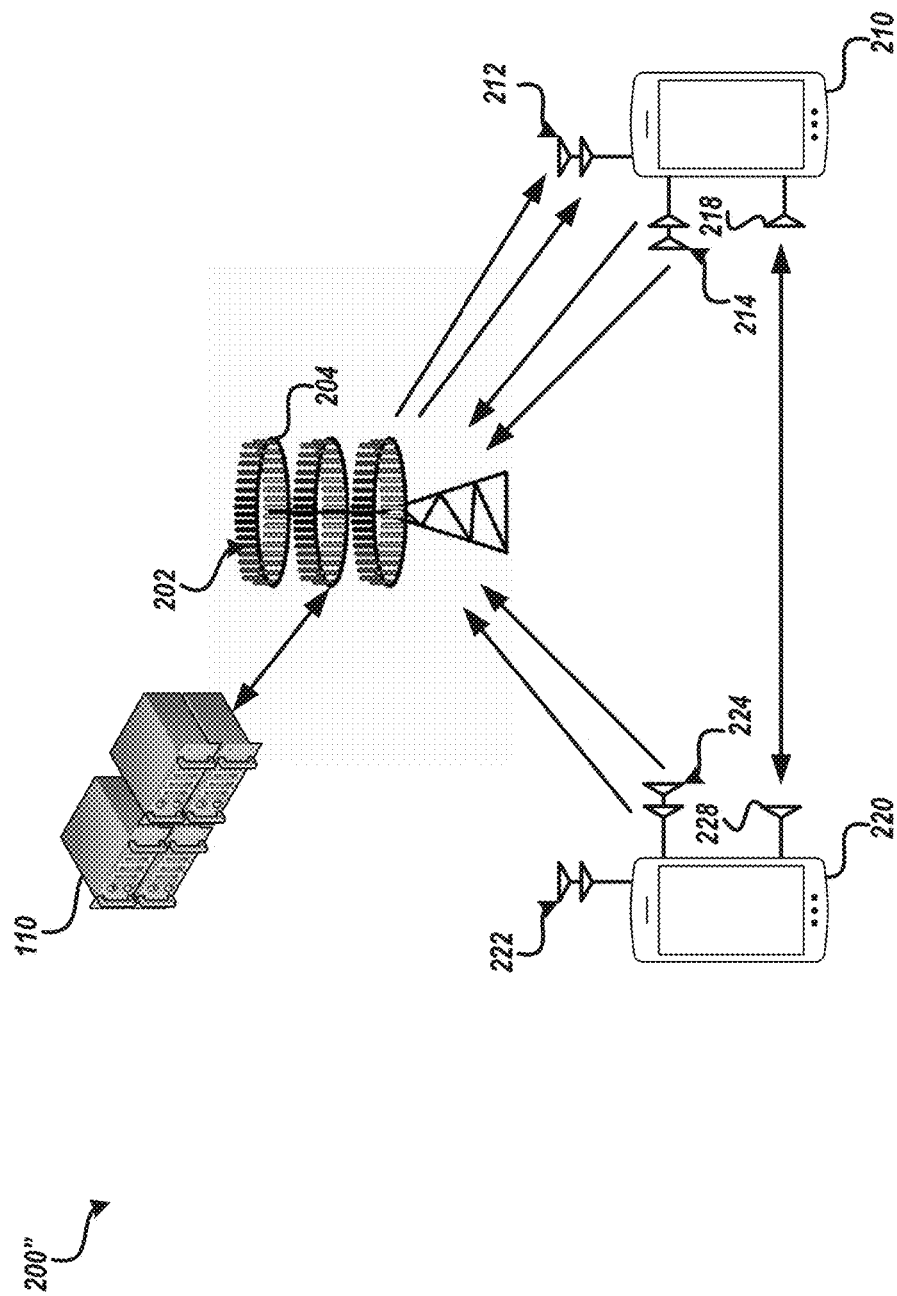
FIG. 2C is a diagram illustrating coordinated transmission of MIMO data for one UE by a pair of UEs communicating via a P2P link according to an embodiment.

The technology disclosed herein can be applied in a variety of applications. For example, two UEs can execute coordinated transmission and/or reception of MIMO data associated with one of the two UEs in applications where excessive network MIMO dimensions are available. In some instances, a higher number of TRPs of a network system are available for transmission than a total number of receive antennas across active UEs. Alternatively or additionally, a higher number of TRPs of a network system are available for receiving than total number of transmit antennas across active UEs. FIGS. 2A to 2C illustrate example environments in which excessive network MIMO dimensions are available and can be used by a pair of UEs to increase the rank of MIMO communication between the network and a UE of the pair.

As another example, nearby UEs in different spatial channels can be available for communicating with different respective TRPs of the network system. A secondary UE nearby a primary UE can establish a high quality P2P connection. The secondary UE can have one or more different preferred spatial beams from one or more TRPs of a network system than the primary UE. The secondary UE can be in relatively low mobility. In this example, the primary UE can be associated with one or more crowded TRPs that can limit service to the primary UE. The primary UE can use a P2P link and the secondary UE to operate at higher order MIMO. FIG. 3B illustrates an example environment in which a pair of UEs can enable communication with one or more additional TRPs to increase rank of MIMO communication between the network and the primary UE.

FIG. 1 is a diagram illustrating a multiple-input multiple-output (MIMO) network in which user equipment (UE) and a network system wirelessly communicate according to an embodiment. FIG. 1 shows an example environment 100 for MIMO wireless communications. Various UEs can communicate with a network system via MIMO communications in the environment 100. Certain UEs of the environment 100 can form a clone pair to increase the data rate and/or MIMO rank of exchanging MIMO data associated with one UE.

Various standards and protocols may be implemented in the environment 100 to wirelessly communicate data between a base station and a wireless communication device. Some wireless devices may communicate using an orthogonal frequency-division multiplexing (OFDM) digital modulation scheme via a physical layer. Example standards and protocols for wireless communication in the environment 100 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base station associated with one or more evolved Node Bs (also commonly denoted as enhanced Node Bs, eNodeBs, or eNBs, gNBs, or any other suitable Node Bs (xNBs)). In some other embodiments, radio network controllers (RNCs) may be provided as the base stations. A base station provides a bridge between the wireless network and a core network such as the Internet. The base station may be included to facilitate exchange of data for the wireless communication devices of the wireless network.

A wireless communication device may be referred to a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). Any suitable UE disclosed herein can be part of a clone pair. A downlink (DL) transmission generally refers to a communication from the base transceiver station (BTS) or eNodeB to the wireless communication device, and an uplink (UL) transmission generally refers to a communication from the wireless communication device to the BTS.

FIG. 1 illustrates a cooperative, or cloud radio access network (C-RAN) environment 100. In the environment 100, the eNodeB functionality is subdivided between a base band unit (BBU) 110 and multiple remote radio units (RRUs) (e.g., RRU 125, RRU 135, and RRU 145). The network system of FIG. 1 includes the BBU 110 and the RRUs 125, 135, and 145. An RRU may include multiple antennas, and one or more of the antennas may serve as a transmit-receive point (TRP). The RRU and/or a TRP may be referred to as a serving node. The BBU 110 may be physically connected to the RRUs such as via an optical fiber connection. The BBU 110 may provide operational information to an RRU to control transmission and reception of signals from the RRU along with control data and payload data to transmit. The RRU may provide data to the network received from UEs within a service area associated with the RRU. As shown in FIG. 1, the RRU 125 provides service to devices within a service area 120. The RRU 135 provides service to devices within a service area 130. The RRU 145 provides service to devices within a service area 140. For example, wireless downlink transmission service may be provided to the service area 140 to communicate date to one or more devices within the service area 140.

The illustrated RRUs 125, 135, and 145 include multiple antennas and can provide MIMO communications. For example, an RRU may be equipped with various numbers of transmit antennas (e.g., 2, 4, 8, or more) that can be used simultaneously for transmission to one or more receivers, such as a UE. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit or receive according to a specific time, frequency, power, and direction configuration. The configuration may be provided by the BBU 110. The direction configuration may be generated based on a network estimate using channel reciprocity and/or determined based on feedback from UE via selection of a beamforming codebook index, or a hybrid of the two.

The service areas shown in FIG. 1 may provide communication services to a heterogeneous population of user equipment. For example, the service area 120 may include a cluster of UEs 160 such as a group of devices associated with users attending a large event. The service area 120 can also include an additional UE 162 that is located away from the cluster of UEs 160. A mobile user equipment 170 may move from the service area 130 to the service area 140. Another example of a mobile user equipment is a vehicle 156 which may include a transceiver for wireless communications for real-time navigation, on-board data services (e.g., streaming video or audio), or other data applications. The environment 100 may include semi-mobile or stationary UEs, such as robotic device 158 (e.g., robotic arm, autonomous drive unit, or other industrial or commercial robot) or a television 154, configured for wireless communications.

A user equipment 152 may be located with an area with overlapping service (e.g., the service area 120 and the service area 130). Each device in the environment 100 may have different performance needs which may, in some instances, conflict with the needs of other devices.

Clone pairs can be formed in the environment 100. For example, there can be more MIMO dimensions from the RRU 125 available to the UE 162 than the UE 162 can process acting alone in certain instances. In such a case, the UE 162 can form a clone pair with the UE 152 to jointly communicate with the RRU 125 in a manner that uses more MIMO dimensions than the UE 162 would alone. As another example, the TRPs of the RRU 125 can be limited for serving the cluster of UEs 160 and the UE 162 in some instances. In such a case, the UE 162 can form a clone pair with the UE 152 and also exchange data associated with the UE 162 with one or more TRPs of the RRU 135. This can enable more TRPs to serve the UE 162 than compared to the UE 162 communicating with the network system alone.

Increasing Rank and/or Data Rate with a Pair of UEs

In various MIMO network environments, a relatively large number of TRPs are available for communicating with UEs. A UE peak data rate can be limited by a antennas and/or streams of the UE in certain instances. For example, a UE with 2 receive antennas and 2 transmit antennas can have an uplink peak rate limited by rank 2 and a downlink peak rate limited by rank 2. With a relatively large number of TRPs available, a network system can have excess capacity to serve the UE. Aspects of this disclosure relate to establishing a P2P link between two UEs and using the reception and/or transmission capabilities of the two UEs to increase the data rate and/or rank associated with one of the UEs. A first UE and a second UE can both wirelessly communicate data associated with the first UE via cellular links. The first UE and the second UE can also communicate with each other via a P2P link while the first UE and the second UE are communicating with a network system via cellular links.

FIG. 2A is a diagram illustrating coordinated transmission and reception of MIMO data for one UE by two UEs communicating via a P2P link according to an embodiment. FIG. 2A illustrates an example of a clone pair enabling a larger number of TRPs to serve a primary UE to thereby increase a data rate and MIMO rank associated with the primary UE.

The example MIMO wireless communication environment 200 of FIG. 2A includes a BBU 110, a RRU 202 with a plurality of TRPs 204, a primary UE 210, and a secondary UE 220. The RRU 202 can be implemented by distributed RRUs in certain applications. The TRPs 204 can be distributed in certain applications. The illustrated primary UE 210 includes receive antennas 212, transmit antennas 214, and an antenna 218. The illustrated receive antennas 212 can receive downlink MIMO data with rank 2. The illustrated transmit antennas 214 can transmit uplink MIMO data with rank 2. The illustrated secondary UE 220 includes receive antennas 222, transmit antennas 224, and an antenna 228. The illustrated receive antennas 222 can receive downlink MIMO data with rank 2. The illustrated transmit antennas 224 can transmit uplink MIMO data with rank 2. A P2P link can be established using the antennas 218 and 228. In various applications, the primary UE 210 and the secondary UE 220 can have different numbers of antennas.

There are a large number of TRPs 204 relative to the number of antennas of the UEs in the environment 200. Accordingly, the communication rate of the primary UE 210 can be limited by the antennas and/or signal chains of the primary UE 210 when the primary UE 210 is in communication with the TRPs 204 by itself. In such a case, the TRPs 204 have excess capacity to serve the primary UE 210.

The primary UE 210 can establish a P2P link with the secondary UE 220. The P2P link can be used to exchange traffic between the primary UE 210 and the secondary UE 220. The P2P link can be a Wi-Fi link, a Bluetooth link, a cellular link, or the like. P2P communications can be out-of-band. P2P communications can be in-band in some cases. The P2P link can enable relatively fast data transfer between the primary UE 210 and the secondary UE 220. In some instances, the secondary UE 220 can process the second part of the MIMO data associated with the primary UE 210 and send the processed data to the primary UE 210 via the P2P link. The data provided over the P2P link can be samples (modulation), bits (physical layer), or bytes (higher layer). The primary UE 210 and the secondary UE 220 can together coordinate transmission and reception of MIMO data associated with the primary UE 210.

Downlink MIMO data associated with the primary UE 210 can be received by the primary UE 210 and the secondary UE 220. A first part of the MIMO data associated with the primary UE 210 can be received by the primary UE 210. A second part of the MIMO data associated with the primary UE 210 can be received by the secondary UE 220. The secondary UE 220 can provide the second part of the MIMO data associated with the primary UE 210 to the primary UE 210 via the P2P link. In the example illustrated in FIG. 2A, the primary UE 210 and the secondary UE 220 can each receive downlink MIMO data with a rank of two. By transferring the second part of the MIMO data associated with the primary UE 210 to the primary UE 210 via the P2P link, the primary UE 210 can receive downlink MIMO data with a rank of 4. Similarly, by transferring the second part of the MIMO data associated with the primary UE 210 to the primary UE 210 via the P2P link, the primary UE 210 can receive downlink MIMO data at about 2 times the maximum data rate corresponding to receiving downlink MIMO data by the antennas 212. The primary UE 210 can process the first part of the MIMO data together with the second part of the MIMO data.

A realization is to mutually exchange information over the P2P link, and each of the primary and second UE's could process 2 of the 4 MIMO layers, with the final decode data transported back to the primary UE. This approach can share the received antenna information and also share the computational processing between the primary and secondary UE's, which can together form a distributed realization of the virtual UE of higher MIMO capability.

Uplink MIMO data associated with the primary UE 210 can be transmitted by the primary UE 210 and the secondary UE 220. A processor of the primary UE 210 can cause transmission of a first part of a MIMO uplink data transmission via the antennas 214 and to cause transmission of a second part of the MIMO uplink data transmission to the secondary UE 220 via the peer-to-peer link. The secondary UE 220 can then transmit the second part of the uplink MIMO data transmission via the antennas 224. In the example illustrated in FIG. 2A, the primary UE 210 and the secondary UE 220 can each transmit uplink MIMO data with a rank of two. By sending the second part of the MIMO data associated with the primary UE 210 to the primary UE 210 via the P2P link, uplink MIMO data associated with the primary UE 210 can be effectively transmitted with a rank of 4. Similarly, by sending the second part of the MIMO data associated with the primary UE 210 to the secondary UE 210 via the P2P link and having the secondary UE 220 transmit the second part of the MIMO data to the network system, uplink MIMO data associated with the primary UE 210 can be effectively transmitted at about 2 times the maximum data rate corresponding to transmitting uplink MIMO data by the antennas 214.

Although the environment 200 of FIG. 2A illustrates using paired UEs to transmit and receive MIMO data, any suitable principles and advantages disclosed herein can be applied to cases where there are unbalanced uplink and downlink wireless communications. For example, downlink data for a primary UE can be received by paired UEs and uplink data for the primary UE can be transmitted to a network system by a single UE only. The MIMO wireless communication environment 200' of FIG. 2B illustrates an example of such a case. The single UE can be the primary UE as illustrated in FIG. 2B. In some instances, the single UE can be the secondary UE. As another example, uplink data for a primary UE can be transmitted to a network system by paired UEs and downlink data for the primary UE can be received from the network system by a single UE. The MIMO wireless communication environment 200" of FIG. 2C illustrates an example of such a case. The single UE receiving downlink data can be the primary UE as shown in FIG. 2C. In some instances, the single UE can be the secondary UE. As one more example, uplink MIMO transmissions associated with a primary UE can be transmitted by paired UEs and downlink MIMO transmissions associated with the primary UE can be received by the paired UEs, in which the uplink and downlink MIMO transmissions have different rank.

FIG. 2B is a diagram illustrating coordinated reception of MIMO data for one UE by two UEs communicating via a P2P link according to an embodiment. FIG. 2B illustrates an example of a clone pair enabling a larger number of TRPs to serve downlink data to a primary UE to thereby increase a downlink data rate and MIMO rank associated with the primary UE. The MIMO wireless communication environment 200' is in a different state than the MIMO wireless communication environment 200 of FIG. 2A. In FIG. 2B, the secondary UE 220 receives MIMO downlink data for the primary UE 210 from the RRU 202. However, the secondary UE 220 does not transmit uplink data for the primary UE 210 to the RRU 202 in the state shown in FIG. 2B. As illustrated, the network system receives uplink data associated with the primary UE 210 from a single UE via cellular communications. In FIG. 2B, the single UE is the primary UE 210.

FIG. 2C is a diagram illustrating coordinated transmission of MIMO data for one UE by two UEs communicating via a P2P link according to an embodiment. FIG. 2C illustrates an example of a clone pair enabling a larger number of transmit antennas to transmit uplink data associated with a primary UE to thereby increase an uplink data rate and MIMO rank associated with the primary UE. The MIMO wireless communication environment 200" is in a different state than the MIMO wireless communication environment 200 of FIG. 2A. In FIG. 2C, the secondary UE 220 transmits MIMO uplink data for the primary UE 210 to the RRU 202. However, the secondary UE 220 does not receive uplink data for the primary UE 210 from the RRU 202 in the state shown in FIG. 2C. As illustrated, the network system transmits downlink data associated with the primary UE 210 to a single UE via cellular communications. In FIG. 2C, the single UE is the primary UE 210.

Embodiments disclosed herein relate to utilizing one or more additional transmit antennas to increase the MIMO rank of a wireless transmission. An alternative approach according to an embodiment is to maintain the same MIMO rank and enable transmit diversity for paired UEs wirelessly communicating with a network system. Accordingly, a secondary UE can provide transmit diversity. Transmit diversity can be, for example, such as described in LTE or another wireless communication standard. The transmit diversity can increase the supported data rate. Examples of transmit diversity include single-frequency network (SFN) modulation and Alamouti space-time block coding (STBC).

The principles and advantages of transmission and/or reception of MIMO data can be applied to other examples beyond the examples shown in FIGS. 2A to 2C. For example, the primary UE 210 and the secondary UE 220 can have different numbers of antennas and/or different transmit and/or receive capabilities. Data communication rates between the primary UE 210 and the network system can increase in such cases by a different amount and/or by a different rank by using a secondary UE for transmission and/or reception of MIMO data associated with the primary UE 210 compared to the examples of FIGS. 2A to 2C. In some instances, a primary UE can include a single antenna to transmit data to the network system and transmit MIMO data and using the single transmit antenna of the primary UE and one or more transmit antennas of a secondary UE in communication with the primary UE via a P2P link. Alternatively or additionally, a primary UE can include a single antenna to receive data from the network system and receive MIMO data and using the single receive antenna of the primary UE and one or more receive antennas of a secondary UE in communication with the primary UE via a P2P link.

Figure 3A:
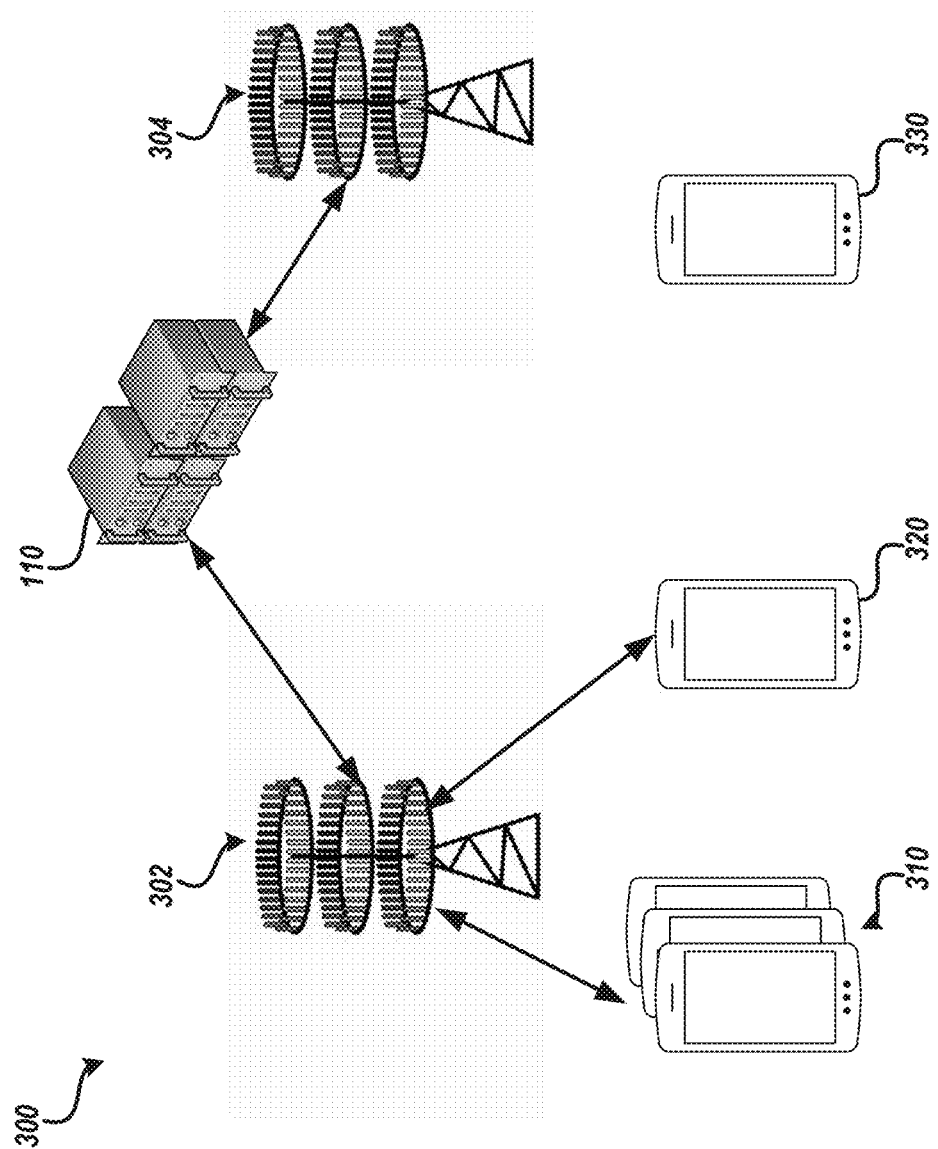
FIG. 3A is a diagram illustrating a MIMO network in which data transmission and reception associated with a primary UE is limited by the number of transmit-receive points (TRPs) for serving the primary UE.
Figure 3B:
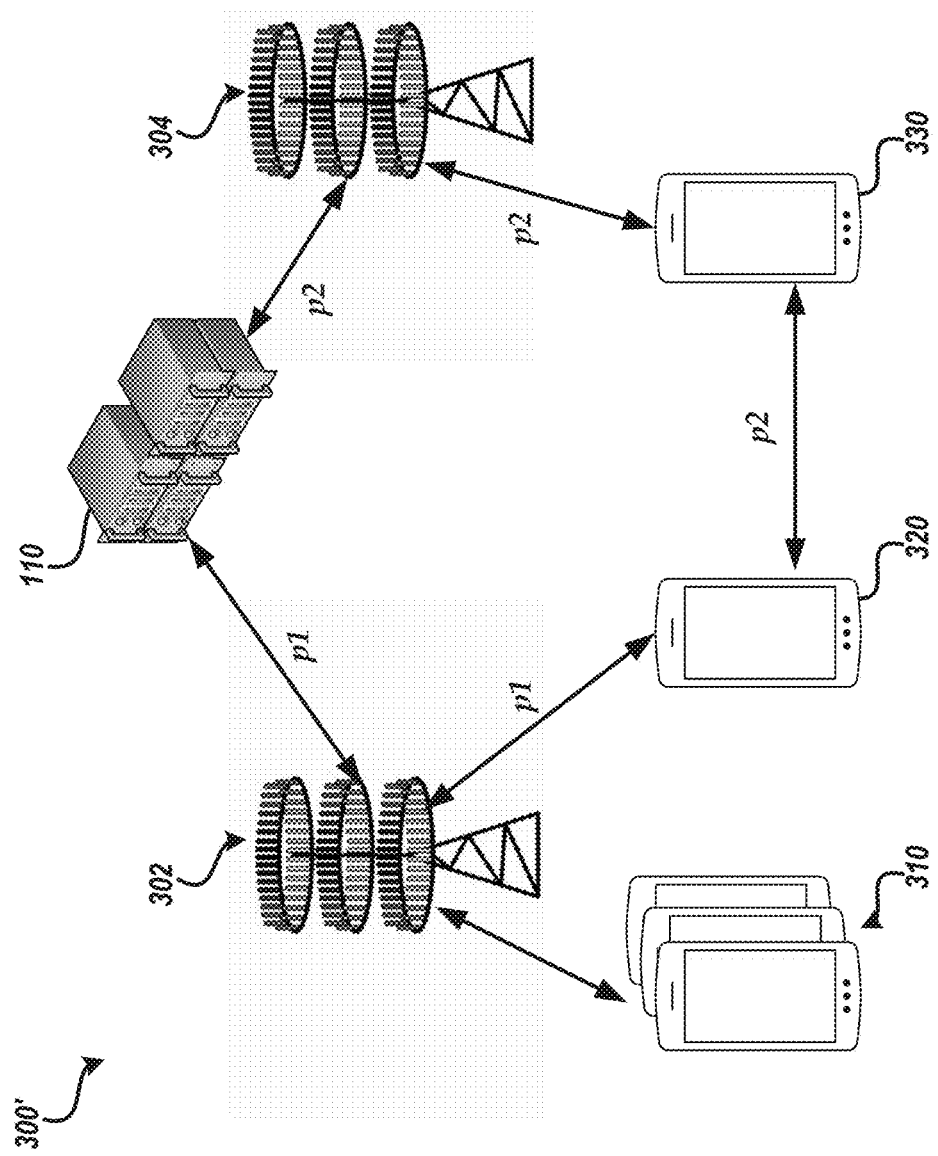
FIG. 3B is a diagram illustrating the primary UE of FIG. 3A with a P2P link with a secondary UE to enable the primary UE to receive MIMO data with a higher rank than in the case of FIG. 3A according to an embodiment.

FIG. 3A is a diagram illustrating a MIMO network in which data transmission and reception associated with a primary UE is limited by the number of TRPs for serving the primary UE. FIG. 3A illustrates a use case that can benefit from technology described herein.

The example MIMO wireless communication environment 300 of FIG. 3A includes a BBU 110, a first RRU 302, a second RRU 304, clustered UEs 310, a first UE 320, and a second UE 330. As illustrated, the clustered UEs 310 are located around TRPs of the first RRU 302. Accordingly, the number of TRPs of the first RRU 302 can be limited for serving the clustered UEs 310 and the first UE 320. In such circumstances, the TRPs of the first RRU 302 can limit the data rate and/or rank of wireless communication between the first UE 320 and the first RRU 302. There are more TRPs in network system available to serve the first UE 320 that are unutilized. For example, the TRPs of the second RRU 304 are unutilized as shown in FIG. 3A. In the environment 300, the second UE 330 is idle.

FIG. 3B is a diagram illustrating the first UE 320 of FIG. 3A with a P2P link with the second UE 330 to enable the first UE 320 to receive MIMO data with a higher rank than in the case of FIG. 3A. FIG. 3B illustrates an example MIMO wireless communication environment 300' in a different state than the MIMO wireless communication environment 300 of FIG. 3A. In FIG. 3B, the first UE 320 functions as a primary UE and the second UE 330 functions as a secondary UE. As illustrated, there is a first path p1 from the BBU 110 to the first UE 320 via the first RRU 302. There is also a second path p2 from the BBU 110 to the first UE 320 via the second RRU 304 and the second UE 330. The state in FIG. 3B enables the first UE 320 and the network system to exchange MIMO data at a higher rate and/or higher MIMO rank than the state of FIG. 3A.

In the environment 300', the previously idle second UE 330 is used as a relay point for the first UE 320. The first UE 320 can establish a P2P link with the second UE 330 and communicate with the second RRU 304 via the P2P link and the second UE 330. The P2P link can enable spatial diversity. This can enable TRPs of the second RRU 304 to serve the first UE 320. The secondary UE 320 can enable a network system to operate at higher-order MU-MIMO. For example, when the first UE 320 and second UE 330 are similar devices, the rank of MIMO communication between the first UE 320 and the network system can be doubled. The actual MIMO order increase can depend on one or more spatial channel conditions and/or capabilities of the second UE 330 and/or the first UE 320.

The principles and advantages disclosed with reference to FIG. 3B can be applied to contexts where there in unbalanced traffic. For example, downlink data for the primary UE 320 can be received by paired UEs 320 and 330 and uplink data for the primary UE 320 can be transmitted to the network system by the primary UE 320 only. As another example, uplink data for the primary UE 320 can be transmitted to the network system by paired UEs 320 and 330 and downlink data for the primary UE 320 can be received from the network system by the primary UE 320 only. As one more example, uplink MIMO transmissions associated with the primary UE 320 can be transmitted by paired UEs 320 and 330 and downlink MIMO transmissions associated with the primary UE 320 can be received by the paired UEs 320 and 330, in which the uplink and downlink MIMO transmissions have different rank.

Network System

Figure 4:
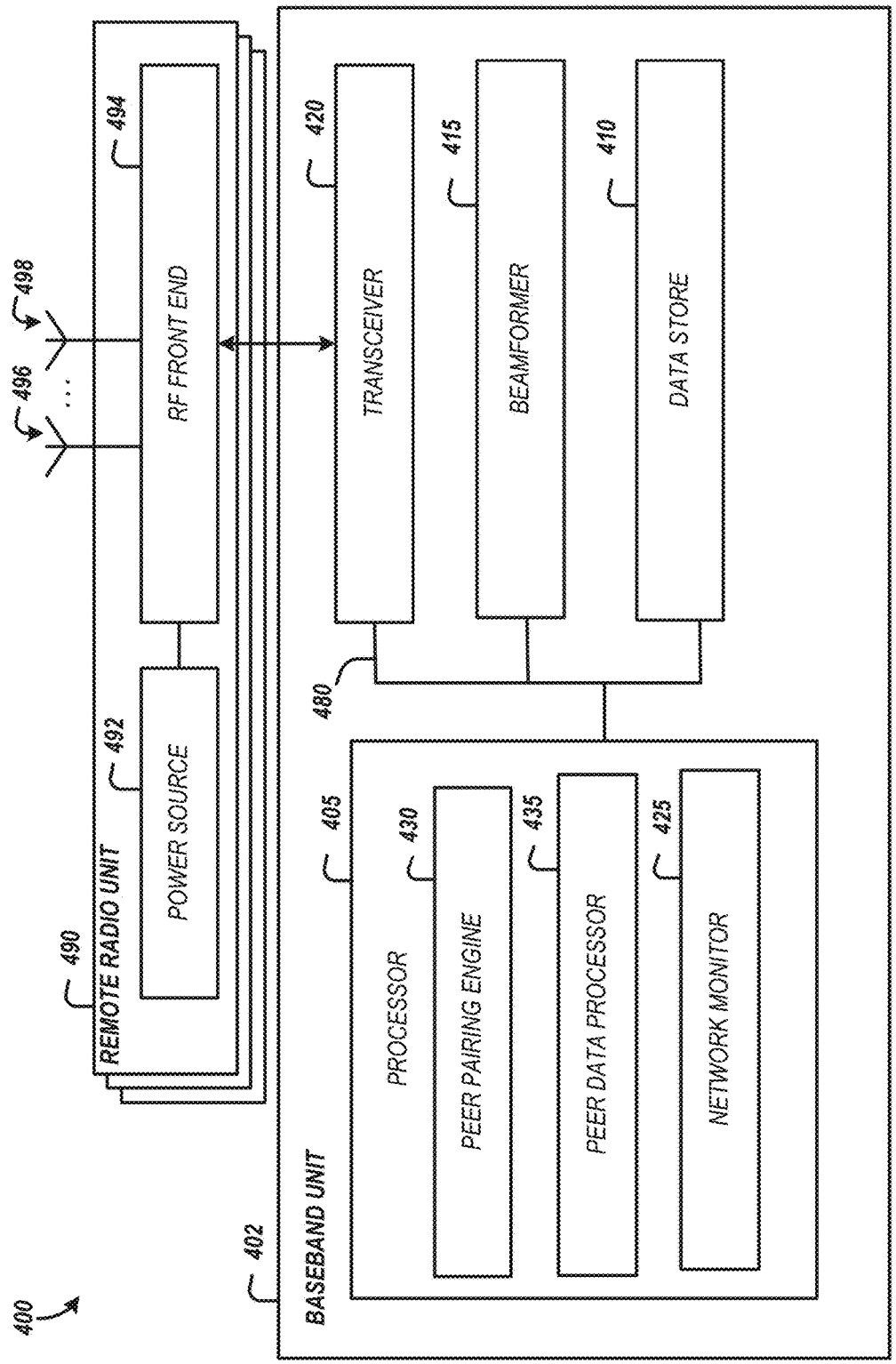
FIG. 4 is a block diagram illustrating a network system that includes an example base band unit and remote radio units according to an embodiment.

FIG. 4 is a block diagram illustrating an example network system 400 that includes base band unit 402 and remote radio units 490 according to an embodiment. The network system 400 of FIG. 4 can wirelessly communicate with UEs in accordance with any suitable principles and advantages disclosed herein.

The base band unit 402 can be coupled with at least one remote radio unit 490. The base band unit 402 can be coupled with a plurality of remote radio units 490. Such remote radio units 490 can be distributed. A remote radio unit 490 can include at least a first antenna 496 and a second antenna 498 for MIMO wireless communications. Any antenna disclosed herein, such as the antenna 496 or the antenna 498, can be referred to as antenna element. A remote radio unit can include any suitable number of antennas and/or arrays of antennas. The antennas 496 and 498 of the RRU 490 can be coupled with a radio frequency (RF) front end 494. The RF front end 494 can process signals received via the antennas 496 and/or 498. Part of processing a signal may include providing the signal to a transceiver 420 included in the BBU 402. The RF front end 494 can process signals provided by the transceiver 420 for transmission via the antennas 496 and/or 498.

As illustrated, the BBU 402 includes a processor 405, a data store 410, a beamformer 415, a transceiver 420, and a bus 480. The bus 480 can couple several elements of the BBU 402. The illustrated processor 405 includes a network monitor 425, a peer pairing engine 430, and a peer data processor 435.

The processor 405 can include any suitable physical hardware configured to perform the functionality described with reference to the processor 405 and elements thereof. The processor 405 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 405 can be implemented by any suitable combination of computing devices and/or discrete processing circuits in certain applications.

The network monitor 425 can detect one or more characteristics of the network such as areas where TRPs of the network system have excess capacity, areas that are relatively heavily loaded, or the like. The peer pairing engine 430 can receive network characteristic data from the network monitor 425 and use the network characteristic data in determining a clone pair. The network monitor 425 can be implemented by dedicated circuitry of the processor 405 and/or by circuitry of the processor 405 that can be used for other functionality.

In certain instances, the network system can pair a primary UE and a secondary UE for coordinated reception and transmission of MIMO data associated with the primary UE. The peer pairing engine 430 can pair the primary UE with the secondary UE in some applications. In response to determining a clone pair, the peer pairing engine 430 can send a clone pairing command to primary UE and/or secondary UE to initiate a clone pair. The peer pairing engine 430 can be implemented by dedicated circuitry of the processor 405 and/or by circuitry of the processor 405 that can be used for other functionality.

The pairing determination can be based on pairing information transmitted by the primary UE and/or the secondary UE to the network system. The peer pairing engine 430 can determine a clone pair based on joint spectral efficiency of a pair of UEs. The joint spectral efficiency can be transmitted to the network system by a primary UE. In some instances, the peer pairing engine can compute joint spectral efficiency for a pair of UEs based on information received from each UE of the pair.

The BBU 402 can receive information from a plurality of UEs and take into account more information than available to a single UE or a pair of UEs in determining a clone pair. Accordingly, the peer pairing engine 430 can take into account pairing information received from a primary UE and/or secondary UE and additional network information in determining the clone pair. The additional network information can include, for example, one or more of mobility state information for one or more UEs, spatial channel state conditions for one or more UEs, system load information, characteristics of one or more UEs (e.g., a traffic state, an amount of battery life, or a device type), information associated with available TRPs associated with one or more of the UEs, the like, or any suitable combination thereof.

In another mode of operation, the peer pairing engine 430 can decide whether to grant a tunnel request from a primary UE to setup a tunnel between the primary UE and the network system that goes through the secondary UE. In response to granting such a request, the network system can set up a tunnel through the secondary UE to the primary UE, for example, based on a dual connectivity protocol.

The peer data processor 435 of the BBU 402 can process and/or aggregate MIMO data associated with a primary UE for coordinated communication with a clone pair. For example, the peer data processor 435 can receive downlink MIMO data for a primary UE, cause a first part of the downlink data for the primary UE to be transmitted to the primary UE, and cause a second part of the downlink data for the primary UE to be transmitted to a secondary UE, in which the secondary UE has a P2P link established with the primary UE. This can enable the primary UE to receive the downlink MIMO data with higher rank and/or at a higher data rate.

As another example, the peer data processor 435 can receive a first part of uplink MIMO data associated with a primary UE from the primary UE, receive a second part of uplink MIMO data associated with the primary UE from a secondary UE, and jointly process and/or combine the first part and the second part of the MIMO data associated with the primary UE.

The peer data processor 435 can be implemented by dedicated circuitry of the processor 405 and/or by circuitry of the processor 405 that can be used for other functionality.

As illustrated, the processor 405 is in communication the data store 410. The data store 410 include instructions that can be executed by the processor 405 to implement any suitable combination of the features described herein. In some implementations, the data store 410 can retain channel information for UEs served by the BBU 402. The data store 410 may be indexed by UE identifier and/or RRU identifier. This can expedite identification of previously communicated scheduling information for the UE and for monitoring network conditions (e.g., number of UEs allocated to an RRU or antenna element of an RRU).

The beamformer 415 can generate parameters for the serving nodes (e.g., RRUs) for a primary UE and a secondary UE. The parameters can include one or more of transmission mode, time, frequency, power, beamforming matrix, tone allocation, or channel rank. The beamformer 415 can determine optimal parameters for RRUs 490 coupled with the BBU 402 that facilitate a network-wide optimization of downlink data transmissions. Similar functionality can be implemented for receiving uplink data transmission.

The illustrated processor 405 is in communication the transceiver 420. The transceiver 420 includes a receiver and a transmitter. The receiver can process signals received from the RF front end 494. The transmitter can provide signals to the RF front end 494 for transmission via one or more antennas 496 and/or 498.

User Equipment

A variety of different UEs can be part of a clone pair. Such UEs can include any suitable UE disclosed herein. Certain UEs can function as either a primary UE or a secondary UE. Some UEs can only function as a primary UE of a clone pair. Various UEs can only function as a secondary UE of a clone pair. As example UE that can function as either a primary UE or a secondary UE of a clone pair will be discussed with reference to FIG. 5.

Figure 5:
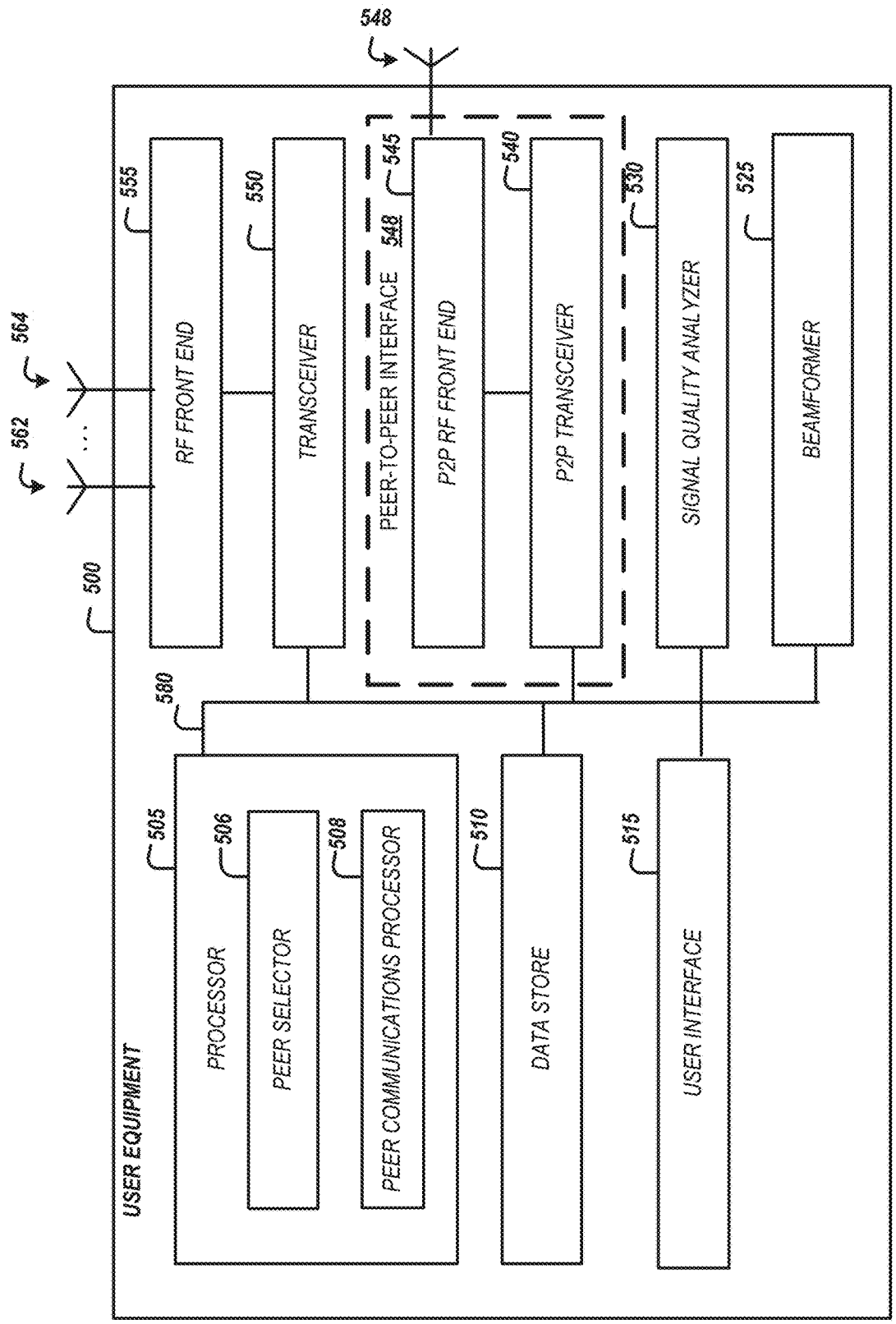
FIG. 5 is a block diagram of an example UE according to an embodiment.

FIG. 5 is a schematic block diagram of an example UE 500 according to an embodiment. The UE 500 is configured for wirelessly communicating with a base station and also wirelessly communicating with another UE via a P2P link. The UE 500 can function as a primary UE. The UE 500 can function as a secondary UE. As illustrated, the UE 500 includes a processor 505 that includes a peer selector 506 and a peer communications processor 508, a data store 510, a user interface 515, a beamformer 525, a signal quality analyzer 530, a peer-to-peer transceiver 540, a peer-to-peer radio frequency front end 545, an antenna 548 for peer-to-peer communications, a transceiver 550, a radio frequency front end 555, and antennas 562 and 564. In some instances, the UE 500 can include a microphone and a speaker (not illustrated). Some other UEs can include additional elements and/or a subset of the elements illustrated in FIG. 5.

The UE 500 includes circuitry for cellular communications. The transceiver 550 and the radio frequency front end 555 can generate signals for uplink cellular data transmissions via the antennas 562 and 564. The transceiver 550 includes a transmitter and a receiver. The transmitter can include one or more transmit chains. In certain instances, the transmitter includes a plurality of transmit chains. The number of transmit chains can set a maximum uplink data rate and/or rank for MIMO data transmitted by the antennas of the UE 500 to a network system. In certain instances, the number of antennas available for wirelessly transmitting uplink data to the network system can set a maximum uplink data rate and/or rank for MIMO data transmitted by the antennas of the UE 500 to a network system The transceiver 550 and the radio frequency front end 555 can process downlink cellular data transmissions received via the antennas 562 and 564. The receiver of transceiver 550 can include one or more receive chains. In certain instances, receiver can include a plurality of receive chains. The number of receive channels can limit maximum downlink data rate and/or rank for MIMO data received by the antennas of the UE 500 from a network system. In certain instances, the number of antennas available for wirelessly receiving downlink data from the network system can set a maximum downlink data rate and/or rank for MIMO data received by the antennas of the UE 500 from the network system.

The UE 500 can include any suitable number of antennas for wirelessly communicating with a network system. The antennas of the UE 500 can include one or more receive only antennas and/or one or more transmit only antennas. The antennas of the UE 500 can include one or more transmit and receive antennas configured to transmit and receive wireless data.

The UE 500 includes circuitry for peer-to-peer wireless communications with another UE. The peer-to-peer wireless communications can be over a non-cellular communication channel. A peer-to-peer wireless interface can refer to circuitry of the UE 500 configured to wirelessly communicate (e.g., receive and/or transmit) data to another UE via a peer-to-peer communication channel. As shown in FIG. 5, the UE 500 includes a peer-to-peer wireless interface 546. The peer-to-peer wireless interface 546 includes a peer-to-peer transceiver 540 and a peer-to-peer radio frequency front end 545. The peer-to-peer transceiver 540 and the peer-to-peer radio frequency front end 545 cause data to be transmitted over the peer-to-peer link via the antenna 548. The peer-to-peer transceiver 540 and the peer-to-peer radio frequency front end 545 can process data received over the peer-to-peer link via the antenna 548. The UE 500 can be configured to transmit and/or receive MIMO physical layer information over the peer-to-peer link in certain applications. Symbol level data can be exchanged over the peer-to-peer link in various applications.

The wireless signals exchanged over the peer-to-peer link can be non-cellular wireless signals. The non-cellular wireless signals can be in accordance with a wireless local area network (WLAN) standard or a wireless personal area network (WPAN) standard. The non-cellular wireless signals can be Bluetooth signals, Wi-Fi signals, ZigBee signals, or the like. The non-cellular wireless signals can have a shorter signal range than cellular signals. In some instances, the non-cellular wireless signals can have a range of about 300 feet or less. The non-cellular wireless signals can have a range of about 150 feet or less in certain applications. The non-cellular wireless signals can have a range of about 35 feet or less in some other applications. In some instances, the wireless signals exchanged over the peer-to-peer link can be cellular signals.

The processor 505 can include any suitable physical hardware configured to perform the functionality described with reference to the processor 505 and elements thereof. The processor 505 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 505 can be implemented by any suitable combination of computing devices and/or discrete processing circuits in certain applications. The peer selector 506 can be implemented by dedicated circuitry of the processor 505 and/or by circuitry of the processor 505 that can be used for other functionality. The peer communications processor 508 can be implemented by dedicated circuitry of the processor 505 and/or by circuitry of the processor 505 that can be used for other functionality.

In certain instances, the UE 500 can initiate a clone pair. The UE 500 can function as a primary UE in certain instances. The peer selector 506 can perform functions related to selecting a secondary UE for a clone pair with UE 500 serving as a primary UE. For example, the peer selector 506 can cause the UE 500 to discover one or more candidate secondary UEs for a clone pair. The peer selector 506 can execute functionality associated with one or more of collecting data from one or more candidate secondary UEs, determining joint spectral efficiency of possible clone pairs, or prioritizing secondary UEs. The peer selector 506 can send pairing information to a network system for making a pairing decision in certain applications. In some other instances, the peer selector 506 can make a pairing decision and initiate a clone pair. Examples of such functionalities of the peer selector 506 are discussed with reference to FIGS. 6 to 8.

As discussed above, the UE 500 can function as a secondary UE of a clone pair. The peer selector 506 can perform functionality associated with the UE 500 deciding whether to function as a secondary UE of a clone pair. For example, the peer selector 506 can accept or reject a request for the UE 500 to function as a secondary UE for a primary UE. The peer selector 506 can make this determination based on one or more of a variety of factors, such as battery life, traffic state, incentives, etc. The peer selector 506 can also initiate a confirmation or rejection of a clone pair request to be send to a primary UE. Examples of such functionalities of the peer selector 506 are discussed with reference to FIGS. 6 to 8.

The peer communications processor 508 can jointly process and/or aggregate MIMO data associated with the UE 500 when the UE 500 is operating as a primary UE of a clone pair. The peer communications processor 508 can jointly process and/or aggregate downlink data received via the antennas 562, 564, and 548. The peer communications processor 508 can jointly process uplink data for transmission via the antennas 562, 564, and 548. The peer communications processor 508 can establish a peer-to-peer link with another UE.

The peer communications processor 508 can perform operations associated with processing and transmitting MIMO data associated with another UE when the UE 500 is operating as a secondary UE of a clone pair. The peer communications processor 508 can cause the UE 508 to enter a clone mode to operate as a secondary UE. The peer communications processor 508 can detect that received data is associated with a primary UE. In certain applications, the peer communications processor 508 can generate symbol level data from MIMO data received from a network system, and the cause the symbol level data to be transmitted to a primary UE via the peer-to-peer link. The peer communications processor 508 can cause MIMO physical layer data to be transmitted to primary UE via the peer-to-peer link. MIMO physical layer data can include data from, for example, high definition video streaming, a relatively large content download, or a social network content sharing application. The peer communications processor 508 can manage communications with another UE over the peer-to-peer link. Examples of functionalities of the peer communications processor 508 are discussed with reference to FIGS. 6 to 8.

The processor 505 can be in communication with the signal quality analyzer 530. The signal quality analyzer 530 can analyze the quality of signals received and/or transmitted by any of the antennas of the UE 500. This can provide information associated with a spatial channel condition of the UE 500. This information can be provided to the processor 505 for determining one or more of a spectral efficiency of the UE 500, an estimated joint spectral efficiency of the UE 500 and another UE, or a relative priority of other UEs as candidate secondary UEs. In some instances, some or all of the functionality of the signal quality analyzer can be implemented by the processor 505.

The beamformer 525 can perform any suitable beamforming functionality for the UE 500. The beamformer 525 can set and/or adjust one or more parameters associated with receiving and/or transmitting signals associated with the antennas 562 and 564 of the UE 500. The beamformer 525 can be implemented by dedicated circuitry and/or circuitry of the processor 505.

The UE 500 includes a data store 510. The data store 510 can store instructions that can be executed by the processor 505 to implement any suitable features described herein. The data store 510 can data associated with candidate secondary UEs, such as joint spectral efficiency data. When the UE 500 functions as a secondary UE, the data store 510 can store an identifier of the primary UE. The identifier of the primary UE can be used by the UE 500 in functioning as a secondary UE. When the UE 500 functions as a secondary UE, the data store 510 can store any other suitable information about a paired primary UE, such as information about MIMO capabilities and/or number of antennas. The data store 510 can store any other suitable data for the UE 500. The data store 510 can include any suitable memory elements arranged to store data.

As illustrated, the UE 500 also includes a user interface 515. The user interface 515 can be any suitable user interface, such as a display and/or an audio component. In some instances, the user interface 515 can include one or more of touch screen capabilities, a button, a knob, a switch, or a slider.

Several elements included in the UE 500 may be coupled by a bus 580. The bus 580 can be a data bus, communication bus, other bus, or any suitable combination thereof to enable the various components of the UE 1200 to exchange information.

Tightly Coupled Mode

A pair of UEs can perform coordinated transmission and/or reception of MIMO data associated with one UE of the pair either as a tightly coupled pair of UEs or as a loosely coupled pair of UEs. In a tightly coupled pair of UEs, the primary UE and the secondary UE can share an identity from a network perspective. A base station can serve the primary UE and the secondary UE with a single-user MIMO operation in the tightly coupled mode. The secondary UE can send processed data to the primary UE via a P2P link for aggregation on the primary UE. Aggregation of MIMO data can be at the physical layer or a higher layer. Data received at the primary UE and secondary UE can also be jointly processed via information shared over the P2P link. Example operations for tightly coupled UE pairs are discussed with reference to FIGS. 6 and 7.

In a tightly coupled mode, the secondary UE can store information associated with the primary UE in memory, such as an identifier of the primary UE and/or information associated with MIMO capabilities of the primary UE (e.g., a number of antennas). Such information can be provided to the secondary UE from the primary UE via a P2P link. Alternatively or additionally, a network system can provide such information associated with the primary UE to the secondary UE in the tightly coupled mode. The secondary UE can provide MIMO physical layer information to the primary UE via a P2P link in the tightly coupled mode. Example MIMO physical layer information that the secondary UE can provide to the primary UE over a P2P link includes one or more of rank, preferred precoding information, or a channel estimate.

For a tightly coupled mode, a clone pair can be initiated while the primary UE is in a traffic state. The primary UE may determine to dissociate the P2P link with the secondary UE in response to detecting channel degradation of the secondary UE. The primary UE may determine to dissociate the P2P link with the secondary UE in response to detecting a change in state of the secondary UE (e.g., a traffic state change, low battery mode, etc.). The primary UE can return from clone mode to a single user mode prior to a clone-haul disassociation.

Clone paring candidate consideration in a tightly coupled mode can be based on a UE based discovery based on P2P beacon measurement. A clone pair candidate in an idle state can be preferred over another clone pair candidate in an active state. In some instances, a secondary UE can be in an active state and be part of a clone pair. Network assisted discovery with a list of available idle secondary UEs can be implemented. A clone pair association only to UEs in communication with the same BBU and/or cell, but that can be in communication with different TRPs within the same BBU and/or cell can be implemented.

Figure 6:
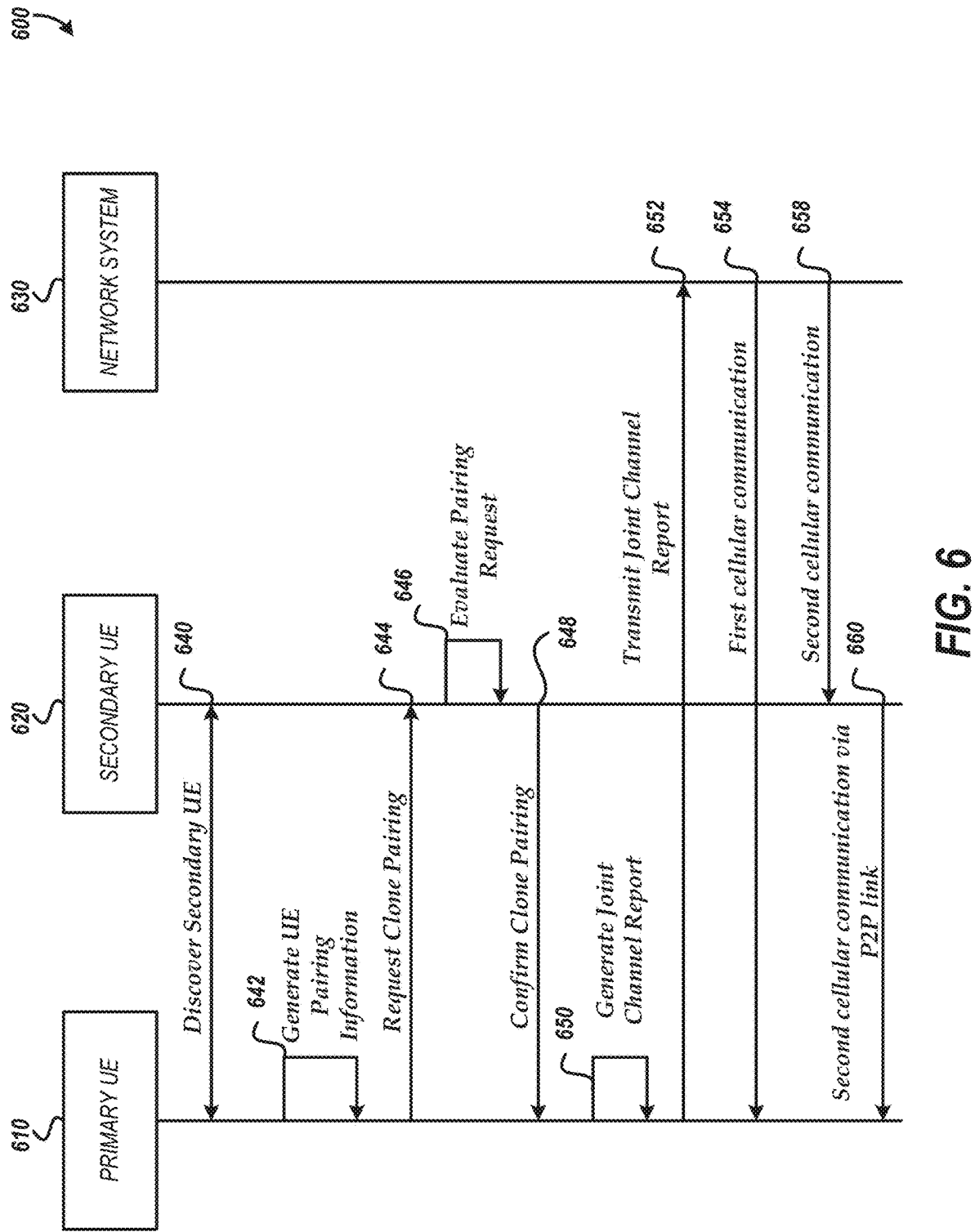
FIG. 6 illustrates example communications and events of an embodiment of establishing a clone pair of UEs and jointly receiving MIMO data associated with one UE of the clone pair using both UEs of the clone pair.

FIG. 6 illustrates example communications and events of an embodiment of establishing a clone pair of UEs and jointly receiving MIMO data associated with one UE of the clone pair using both UEs of the clone pair. The communications and events of FIG. 6 relate to a tightly coupled mode in which a primary UE 610 and a secondary UE 620 share an identity as a clone pair. In the communications and events of FIG. 6, the clone pair decision is UE centric. The message flow 600 illustrates example communications and events associated with a primary user equipment 610, a secondary user equipment 620, and a network system 630. The primary UE 610 can implement any suitable features of the UEs disclosed herein. The secondary UE 620 can implement any suitable features of the UEs disclosed herein. The network system 630 may include a base band unit or other network device configured to schedule communications with devices within a service area. The network system 630 can also include a plurality of RRUs and/or TRPs. Additional or alternative entities may be included to mediate one or more of the interactions shown such as network routers, switches, security devices, or the like.

In event 640, the primary UE 610 can discover the secondary UE 620. The discovery may include receiving, at the primary UE 610 a message from the secondary UE 620. In some implementations, the discovery may be a broadcast discovery whereby a message is generally transmitted to devices within a range of the primary UE 610. The discovery may include peer-to-peer beacons and/or signals. The message may include information indicating clone pairing capabilities. In such instances, devices that can perform clone pairing may respond. Although shown as discovering a single secondary UE in FIG. 6, the primary UE 610 may discover two or more secondary UEs with which it could establish a clone pairing. The secondary UE 620 may be within the same cell as the primary UE 610. In some instances, the secondary UE 620 and the primary UE 610 can be served by different TRPs within the same cell.

The primary UE 610 can collect information associated with the secondary UE 620. For example, the primary UE 610 can collect one or more of availability of the secondary UE 620 to serve as a secondary UE for the primary UE 610, recent channel quality indicator (CQI) information, precoding selection, or the like. The primary UE 610 can store the collected information associated with the secondary UE 620. The primary UE 610 can collect and store information associated with a plurality of secondary UEs 620.

After discovering the secondary UE 620, the primary UE 610 may generate pairing information at event 642. The primary UE 610 can compute a joint spectral efficiency of the primary UE 610 and the secondary UE 620 operating as a clone pair. The computation of spectral efficiency can be based on information collected associated with discovering the secondary UE in event 640. For example, the joint spectral efficiency can be based on cellular channel information for the secondary UE 620, information about the P2P link, and cellular channel information for the primary UE 610. The UE pairing information can include the joint spectral efficiency. The joint spectral efficiency and/or other pairing information can be computed for one or more additional secondary UEs. The primary UE 610 can generate a priority secondary UE list indicating an order of preference of using secondary UEs as a clone pair in cases where more than one secondary UE is discovered.

The pairing information can include information that can be used by the secondary UE 620 to clone the primary UE 610. The pairing information may include information identifying the primary UE 610 such as precoding information, a UE subscriber identifier (ID), or an assigned Internet Protocol (IP) address. The pairing information may include an identification of a type and/or an amount of data expected to be transmitted and/or received via the clone pairing. In some implementations, the pairing information may identify a desired active set of one or more serving nodes.

The primary UE 610 can initiate a pair request. In event 644, the primary UE 610 can transmit a pairing request to the secondary UE 620. The pairing request can include pairing information generated at event 642. In cases where multiple secondary UEs are discovered, the primary UE 610 may transmit a message to the top candidate secondary UE and wait a pre-determined period of time for an acknowledgement. The top candidate secondary UE can have the highest joint spectral efficiency with the primary UE 610 of the possible clone pairs. The primary UE 610 can prioritize candidate secondary UEs based on one or more operational characteristics of a secondary UE and/or based on one or more pairing metrics associated with the secondary UE. One or more of operational characteristics and/or one or more of the pairing metrics described in association with the secondary UE 620 determining whether to accept the request can be used by the primary UE 610 in prioritizing candidate secondary UEs. If an acknowledgement is not received from the top candidate secondary UE, the primary UE 610 can continue to the next candidate in the priority peer list until an acknowledgement is received. If no acknowledgement is received from any candidate secondary UE, the message flow 600 can terminate and/or start over.

In event 646, the secondary UE 620 can determine whether to accept the clone pairing request. The determination may include evaluating the type and/or amount of data expected via the clone pairing. The determination may compare the expectations to the resources desired by the secondary UE 620 to support its own operations. The determination may include detecting an operational characteristic of the secondary UE 620, such as power level (e.g., battery power), processor load, memory, applications executing on the secondary UE 620, existing clone pairings with other UEs, MIMO capabilities, traffic state of the secondary UE 620 (e.g., whether the secondary UE 620 is idle or actively communicating with the network system 630), a channel condition associated with the secondary UE 620, or another detectable operational metric for the secondary UE 620. In some implementations, the operational characteristic may be compared to a threshold and if the characteristic satisfies the threshold, the determination may indicate the secondary UE 620 is able to establish clone pairing with the primary UE 610. In certain applications, a plurality of operational characteristics can each be compared to a respective threshold, and the determination of whether to accept a clone pairing request can be based on the comparisons. The determination can be made based on some or all of the operational characteristics satisfying respective thresholds.

The determination can be based on one or more of a variety of factors. For example, the determination can be based on one or more pairing metrics. Example pairing metrics include one or more lists associated with a user equipment such as a social network list, one or more a priori agreements, or incentives such as tokens provided for serving in a clone pair. Example incentives include cellular data allowance transfer from the primary UE, digital cash, or credit tokens associated with a social network service. In some instances, a pairing can be based on one or more explicit (e.g., group of users who have agreed to cooperate) or implicit a priori agreements (e.g., a friend list or list of users with common interest defined by social network service). In response to determining to establish a clone pair, the secondary UE 620 can send a confirmation to the primary UE 610 at event 648. If the pairing request is not granted by the secondary UE 620, the primary UE 610 can send a pairing request to the next highest secondary UE on the priority list.

In response to the secondary UE 620 confirming the paring request at event 648, the primary UE 610 and the secondary UE 620 can establish a clone pair. A P2P link can be established between the primary UE 610 and the secondary UE 620. The primary UE 610 can request CQI and/or precoding information from the secondary UE 620. The secondary UE 620 can estimate its own cellular channel information and provide the cellular channel information, such as channel state quality and/or channel noise estimates, to the primary UE 610 via the P2P link.

In event 650, the primary UE 610 can generate a joint channel report including cellular channel information for the primary UE 610 and the secondary UE 620. The joint channel report can include any suitable joint channel information. For example, the joint channel report can include one or more of a joint CQI, rank, or precoding selection. The joint CQI, rank, and/or precoding selection can be computed based on information associated with the primary UE 610 and information associated with the secondary UE 620.

The primary UE 610 can transmit the joint channel report to the network system 630 at event 652. Alternatively or additionally, the secondary UE 620 can transmit the joint channel report to the network system 630. The transmission of the joint channel report may occur via a cellular channel to one or more TRPs. The joint channel report can be periodically generated and transmitted to the network system 630 in certain applications.

The network system 630 can serve traffic associated with the primary UE 610 based on the joint channel report. The network system 630 can serve the primary UE 610 based on the paired CQI of the primary UE 610 and the secondary UE 620. The network system 630 can schedule and transmit cellular communications with the primary UE 610 and the secondary UE 620.

The network system 630 can send a first cellular communication to the primary UE 610 at event 654. The first cellular communication can include a first part of a MIMO transmission to the primary UE 610. The network system 630 can send a second cellular communication to the secondary UE 620 at event 658. The second cellular communication can include a second part of the MIMO transmission to the primary UE 610. The second cellular communication can be concurrent with the first cellular communication. Accordingly, the network system 630 can serve traffic to the primary UE 610 and the secondary UE 620 concurrently. The first part and the second part of the MIMO transmission can include information indicating the respective cellular communications are associated with the primary UE 610. The information can include an identifier or hash code, for example. The information may be implied by a timing slot or frequency used to transmit the cellular communications.

The secondary UE 620 can determine that the second part of the MIMO transmission includes a communication for the primary UE 610. The secondary UE 620 can provide the second part of the MIMO transmission to the primary UE 610 via the P2P link at event 660. The secondary UE 620 can pass the second part of the MIMO transmission directly over the P2P link. In certain applications, the P2P link between the primary UE 610 and the secondary UE 620 can preferably occur over an air interface with a relatively short range, such as Bluetooth, Wi-Fi, ZigBee, or other standardized or proprietary local area network protocol. The P2P link between the primary UE 610 and the secondary UE 620 can enable cellular communications, such as cellular communications at relatively high frequencies. In certain applications, the second part of the MIMO transmission can be encapsulated, modified, or otherwise reformatted into a format suitable for transmission via the peer-to-peer channel.

After event 660, the primary UE 610 can jointly process the first part of the MIMO transmission and the second part of the MIMO transmission.

The primary UE 610 and the secondary UE 620 can also jointly send uplink MIMO data from the primary UE 610 to the network 630. Similar events and communications can be implemented for uplink communications. For example, the primary UE 610 may transmit cellular communications to the network system 630 via a cellular interface and to the secondary UE 620 via the peer-to-peer link. The secondary UE 620 may, in turn, transmit the received communication to the network system 630. In some implementations, the uplink transmissions to the network system 630 from the primary UE 610 and the secondary UE 620 may be coordinated (e.g., time, frequency, and/or spatial). The coordination may be specified during the pairing process.

The pairing may be terminated based on changed network conditions. For example, the primary UE 610 may detect channel degradation for the secondary UE 620 or a change in state (e.g., traffic state change, low battery) of secondary UE 620. Control messages may be exchanged between the primary UE 610 and the secondary UE 620 to indicate one or more such changing conditions. It may be desirable for the primary UE 610 to transmit a channel report identifying a single-user mode before disassociating with the secondary UE 620. In some implementations, the primary UE 610 may be limited to one active clone pairing. Accordingly, if a better secondary UE is detected (e.g., stronger signal strength, power level, etc.), the primary UE 610 may first disassociate from the secondary UE 620 before initiating a clone pairing with the better secondary UE.

In the message flow 600 shown in FIG. 6, the primary UE 610 may assess whether and which secondary UE to request to be in a clone pair. In some implementations, a network system may assist and/or direct a clone pairing.

Figure 7:
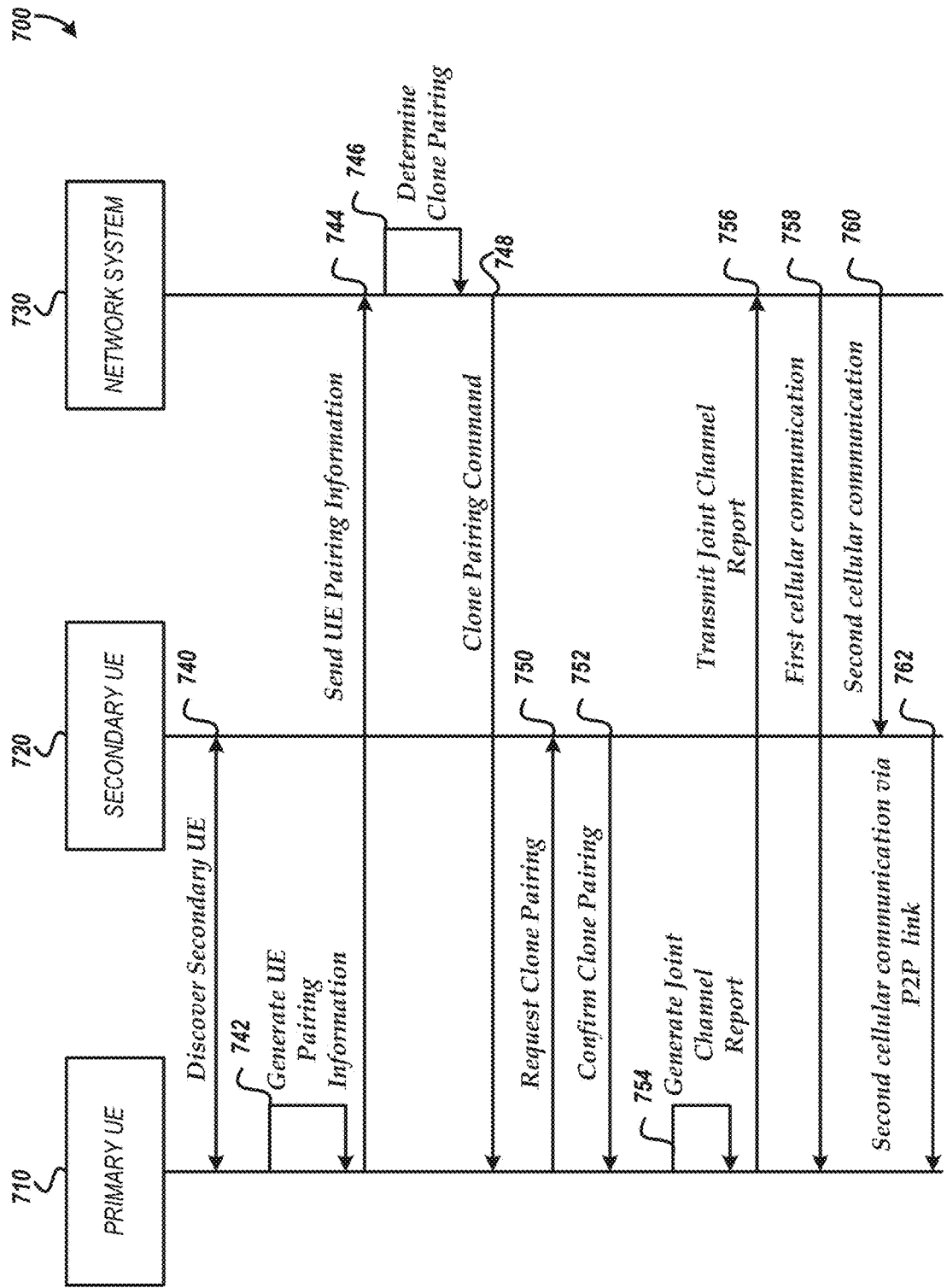
FIG. 7 illustrates example communications and events of an embodiment of establishing a clone pair of UEs and jointly receiving MIMO data associated with one UE of the clone pair using both UEs of the clone pair.

FIG. 7 illustrates example communications and events of an embodiment of establishing a clone pair of UEs and jointly receiving MIMO data associated with one UE of the clone pair using both UEs of the clone pair. The communications and events of FIG. 7 relate to a tightly coupled mode in which a primary UE 710 and a secondary UE 720 share an identity as a clone pair. In the communications and events of FIG. 7, a network system 730 makes a determination to pair the primary UE 710 and the secondary UE 720 as a clone pair. The message flow 700 illustrates example communications and events associated with a primary user equipment 710, a secondary user equipment 720, and a network system 730. The primary UE 710 can implement any suitable features of the UEs disclosed herein. The secondary UE 720 can implement any suitable features of the UEs disclosed herein. The network system 730 can include a base band unit or other network device configured to schedule communications with devices within a service area. Additional or alternative entities may be include to mediate one or more of the interactions shown such as network routers, switches, security devices, or the like.

In event 740, the primary UE 710 can discover the secondary UE 720. The discovery may include receiving, at the primary UE 710 a message from the secondary UE 720. In some implementations, the discovery may be a broadcast discovery whereby the message is generally transmitted to devices within a range of the primary UE 710. The discovery may include peer-to-peer beacons and/or signals. The message may include information indicating clone pairing capabilities. In such instances, devices that can perform clone pairing may respond. Although shown as discovering a single secondary UE in FIG. 7, the primary UE 710 may discover two or more secondary UEs with which it may establish a clone pairing. The secondary UE 720 may be within the same cell as the primary UE 710. In some instances, the secondary UE 720 and the primary UE 710 can be served by different TRPs within the same cell.

The primary UE 710 can collect information associated with the secondary UE 720. For example, the primary UE 710 can collect one or more of availability of the secondary UE 720 to serve as a secondary UE for the primary UE 710, recent CQI information, precoding selection, or the like. The primary UE 710 can store the collected information associated with the secondary UE 720. The primary UE 710 can collect and store information associated with a plurality of secondary UEs 720.

After discovering the secondary UE 720, the primary UE 710 may generate pairing information at block 742. The primary UE 710 can compute a joint spectral efficiency of the primary UE 710 and the secondary UE 720 operating as a clone pair. The computation of spectral efficiency can be based on information collected associated with discovering the secondary UE in event 740. The UE pairing information can include the joint spectral efficiency. The joint spectral efficiency and/or other pairing information can be computed for one or more additional secondary UEs. The primary UE 710 can generate a priority secondary UE list indicating an order of preference of using secondary UEs in a clone pair in cases where more than one secondary UE is available.

The pairing information can include information that can be used by the secondary UE 720 to clone the primary UE 710. The pairing information may include information identifying the primary UE 710 such as precoding information, a UE subscriber ID, or an assigned Internet Protocol (IP) address. The pairing information may include an identification of a type or amount of data expected to be transmitted or received via the clone pairing. In some implementations, the pairing information may identify a desired active set of one or more serving nodes.

The primary UE 710 can transmit UE pairing information to the network system 730 at event 744. Because the network system 730 can detect conditions of the network which may not be accessible to the primary UE 710, the network system 730 may use the increased information to determine the clone pairing for the primary UE 710. In event 746, the network system 710 can determine a clone pair. The network system 730 can update the priority secondary UE list. In the example of FIG. 7, the clone pair includes the primary UE 710 and the secondary UE 720. The network system 730 can determine the clone pair based on the UE pairing information transmitted at event 744. For example, the network system 730 can determine the clone pair based on joint spectral efficiency of a pair of UEs.

The network system 730 can also take into account other network information in determining the clone pair at event 746. The other network information can include information identifying the mobility of secondary UEs. For example, the primary UE 710 may determine that a specific secondary UE has a particularly strong signal strength but, unbeknownst to the primary UE 710, is that the specific secondary UE is located on a moving vehicle that is likely to soon exceed a desired distance range for clone pairing. The network system 730 can use a criterion based on a set of metrics of the primary UE 710, the secondary UE 710, or/and other UEs served by the network system to determine the best operating regime to serve the primary UE 710. The metrics can include a device mobility state, a Doppler estimate, a measure of the network-to-UE channel matrix condition such as Eigen-value spread, a network congestion measure (e.g., network load), the like, or any suitable combination thereof. The metrics can include one or more operational characteristics of the secondary UE 720 and/or one or more pairing metrics. In a tightly coupled mode, the uplink transmissions from both the primary UE 710 and the secondary UE 720 can appear as one transmission from the primary UE 710. This can be indicated by channel assignment and/or signaling overhead.

If the clone pairing result from event 746 is not to establish a clone pair (e.g., no secondary UEs were available for pairing), the message flow 700 can terminate and/or start over. In such instances, the network system 730 may transmit a message to the primary UE 710 that a clone pair is not being established.

In the message flow 700 shown in FIG. 7, the secondary UE 720 is identified by the network system 730 for pairing with the primary UE 710. The network system 730 may communicate the identified pairing information to the primary UE 710 in event 748. This can involve sending a clone pairing command. The pairing information may include an identifier for the secondary UE 720. In some implementations, the pairing information may include a security token and/or other authentication information to verify the pairing as being performed by one or more parties authorized by the network system 730. The clone pairing command can signal to the primary UE 710 to initiate a P2P link with a particular secondary UE 720. In some instances, the network 730 can provide information identifying a priority list of secondary UEs to establish a P2P link with and an order to try establishing the P2P link.

The primary UE 710 can transmit a clone pairing request to the secondary UE 720 at event 750. Then the secondary UE 720 can enter a clone mode. The secondary UE 720 can send a confirmation to the primary UE 710 that the secondary UE 720 accepts the request to enter the clone mode at event 752. In some instances, the secondary UE 720 can also send a confirmation to the network system 730. Unlike in FIG. 6, the secondary UE 720 can depend on the determination of the network system 730 when accepting the request for pairing. In some implementations, the secondary UE 720 may perform some confirmation of its ability to be part of clone pair (e.g., detecting that it has sufficient power).

A P2P communication channel can be established between the primary UE 710 and the secondary UE 720 for clone traffic to and/or from the primary UE 710. In the clone mode, the secondary UE 720 can estimate its own channel information and provide the channel information estimate to the primary UE 710 via the P2P link. The channel information can include cellular channel information for the secondary UE 720, such as channel state quality and/or channel noise estimates.

In event 754, the primary UE 710 can generate a joint channel report for the primary UE 710 and the secondary UE 720. The joint channel report can include any suitable joint channel information. For example, the joint channel report can include one or more of a joint CQI, rank, or precoding selection. The joint QCI, rank, and/or precoding selection can be computed based on information associated with the primary UE 710 and information associated with the secondary UE 720. The joint channel report can appear to the network system 730 as if were associated with a single UE when in fact the primary UE 710 and secondary UE 720 are operating as a clone pair.

The primary UE 710 can transmit the joint channel report to the network system 730 at event 756. Alternatively or additionally, the secondary UE 720 can transmit the joint channel report to the network system 730. The transmission of the joint channel report may occur via a cellular channel to one or more TRPs. The joint channel report can be periodically generated and transmitted to the network system 730 in certain applications.

The network system 730 can serve traffic associated with the primary UE 710 based on the joint channel report. The network system 730 can serve the primary UE 710 based on the paired CQI of the primary UE 710 and the secondary UE 720.

The network system 730 can send a first cellular communication to the primary UE 710 at event 756. The first cellular communication can include a first part of a MIMO transmission to the primary UE 710. The network system 730 can send a second cellular communication to the secondary UE 720 at event 760. The second cellular communication can include a second part of the MIMO transmission to the primary UE 710. The second cellular communication can be concurrent with the first cellular communication. Accordingly, the network system 730 can serve traffic to the primary UE 710 and the secondary UE 720 concurrently. The first part and the second part of the MIMO transmission can include information indicating the respective cellular communications are associated with the primary UE 710. The information can include an identifier or hash code, for example. The information may be implied by a timing slot or frequency used to transmit the cellular communications.

The secondary UE 720 can determine that the second part of the MIMO transmission includes a communication for the primary UE 710. The secondary UE 720 can provide the second part of the MIMO transmission to the primary UE 710 via the P2P link at event 762. The secondary UE 720 can pass the second part of the MIMO transmission directly over the P2P link. The P2P link between the primary UE 710 and the secondary UE 720 can preferably occur over an air interface with a relatively short range, such as Bluetooth, Wi-Fi, ZigBee, or other standardized or proprietary local area network protocol. In certain applications, the second part of the MIMO transmission can be encapsulated, modified, or otherwise reformatted into a format suitable for transmission via the peer-to-peer channel.

After event 762, the primary UE 710 can jointly process the first part of the MIMO transmission and the second part of the MIMO transmission.

The primary UE 710 and the secondary UE 720 can also jointly send uplink MIMO data from the primary UE 710 to the network 730. Similar events and communications can be implemented for uplink communications. For example, the primary UE 710 may transmit cellular communications to the network system 730 via a cellular interface and to the secondary UE 720 via the peer-to-peer link. The secondary UE 720 may, in turn, transmit the received communication to the network system 730. In some implementations, the uplink transmissions to the network system 730 from the primary UE 710 and the secondary UE 720 may be coordinated (e.g., time, frequency, and/or spatial). The coordination may be specified during the pairing process. In a tightly coupled mode, the uplink transmissions from both the primary UE 710 and the secondary UE 720 can appear as one transmission from the primary UE 710. This can be indicated by channel assignment and/or signaling overhead.

The pairing may be terminated based on changed network conditions and/or a change in a UE condition, such as mobility or available battery. For example, the primary UE 710 may detect channel degradation for the secondary UE 720 or a change in state (e.g., traffic state change, low battery) of secondary UE 720. Control messages may be exchanged between the primary UE 710 and the secondary UE 720 to indicate one or more such changing conditions. It may be desirable for the primary UE 710 to transmit a channel report identifying a single-user mode before disassociating with the secondary UE 720. In some implementations, the primary UE 710 may be limited to one active clone pairing. Accordingly, if a better secondary UE is detected (e.g., stronger signal strength, power level, etc.), the primary UE 710 may first disassociate from the secondary UE 720 before initiating a clone pairing with the better secondary UE.

FIGS. 6 and 7 illustrate a tight coupling between a primary UE and a secondary UE. The tightly coupled mode can be characterized, at least in part, by how the UEs appear to the network system. From the perspective of the network system, the primary UE and the secondary UE can appear as a single transmit-receive device. This can allow the network system and the primary UE to exchange information at higher rates and/or with higher MIMO rank because of the aggregation of antennas across the primary and secondary UEs.

Loosely Coupled Mode

In some implementations, it may be desirable to allow each UE of a clone pair to maintain its own identity, but increase the rate by tunneling. In such instances, first data may be transmitted to the primary UE along a first beam and second data may be transmitted to the secondary UE along a second beam. The secondary UE may then transfer the second data to the primary UE through a cloned peer connection. This tunneling arrangement may be referred to a loose coupling.

In a loosely coupled pair of UEs, the primary UE and the secondary UE can have different identities from a network perspective. The primary UE can establish a dual connectivity (DC) tunnel through the secondary UE. TRPs of a network system can serve both the primary UE and the secondary UE in MU-MIMO operation. A long term evolution-new radio (LTE-NR) DC protocol, for example, can be leveraged by the primary UE to aggregate MIMO data. Aggregation can be performed at a higher layer. For example, a Packet Data Convergence Protocol (PDCP), an application layer (reuse DC protocol), or a radio link control (RLC) protocol can be used in aggregating data by the primary UE. Example operations for tightly coupled UE pairs are discussed with reference to FIG. 8.

For a loosely coupled mode, the clone process can be initiated while the primary UE is in a traffic state. The primary UE may determine to dissociate the P2P link with the secondary UE in response to detecting channel degradation of the secondary UE. The primary UE may determine to dissociate the P2P link with the secondary UE in response to detecting a change in state of the secondary UE (e.g., a traffic state change, low battery mode, etc.). Tunnel set up and tear down protocol can leverage an LTE DC protocol. The primary UE can tear down a tunnel before setting up a new tunnel.

Clone paring candidate consideration in a loosely coupled mode can be based on a UE centric discovery based on P2P beacon measurement. A clone pair candidate can be in an idle state or in an active state. Network assisted discovery with a list of available idle secondary UEs can be implemented. Tunnel association can be implemented between UEs connection to the same cell or two or more different cells.

Figure 8:
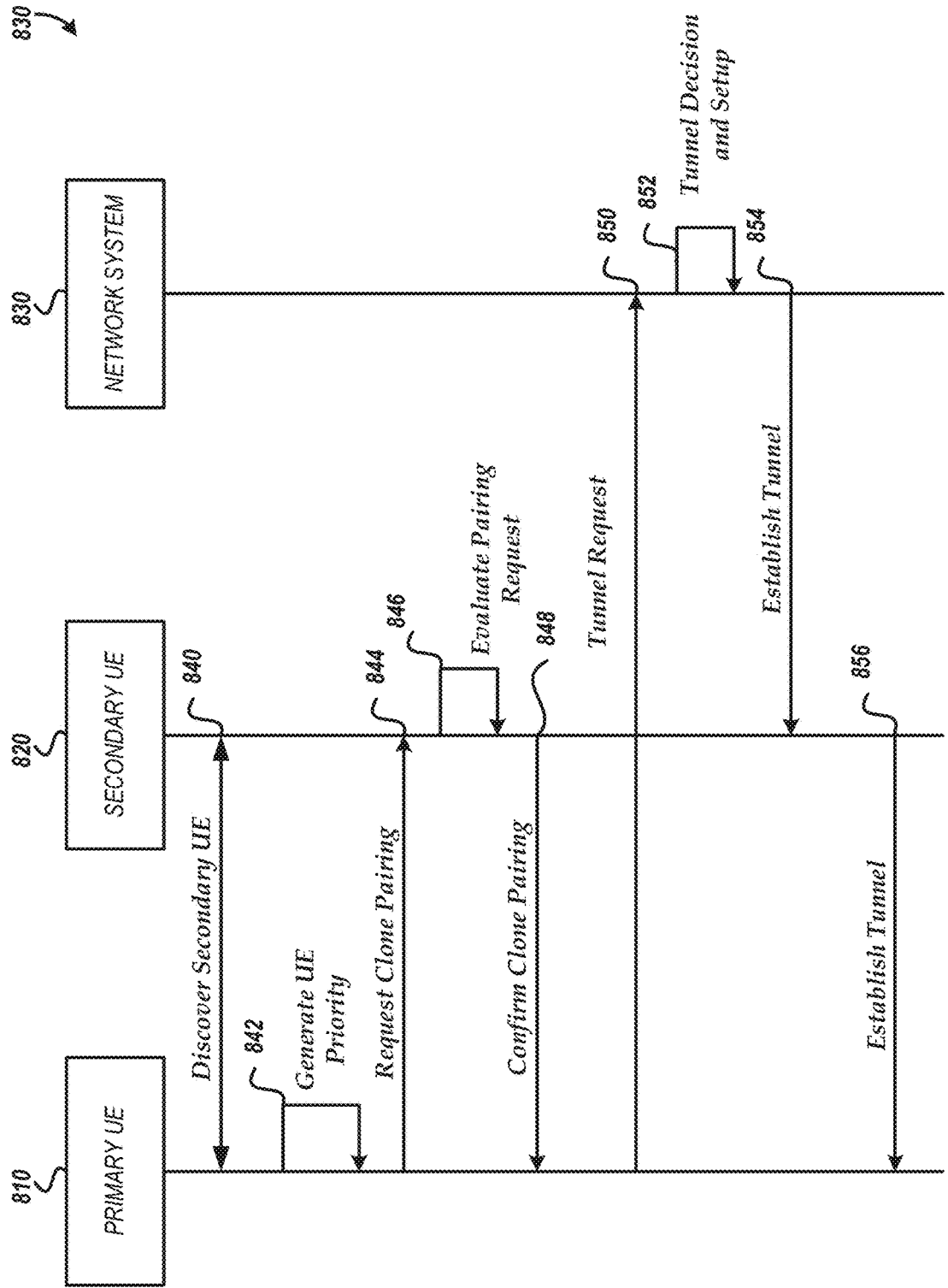
FIG. 8 illustrates example communications and events of an embodiment of detecting a clone pair of UEs and establishing a tunnel to a primary UE through the secondary UE.

FIG. 8 illustrates example communications and events of an embodiment of establishing a clone pair of UEs and a tunnel to a primary UE through a secondary UE. The communications and events of FIG. 8 relate to a loosely coupled mode in which a primary UE 810 and a secondary UE 820 can retain separate identities from the perspective of the network. In the communications and events of FIG. 8, the clone pair decision is UE centric. The message flow 800 illustrates example communications and events associated with a primary user equipment 810, a secondary user equipment 820, and a network system 830. The primary UE 810 can implement any suitable features of the UEs disclosed herein. The secondary UE 820 can implement any suitable features of the UEs disclosed herein. The network system 830 may be or include a base band unit or other network device configured to schedule communications with devices within a service area. Additional or alternative entities may be included to mediate one or more of the interactions shown such as network routers, switches, security devices, or the like.

In event 840, the primary UE 810 can discover the secondary UE 820. The discovery may include receiving, at the primary UE 810 a message from the secondary UE 820. In some implementations, the discovery may be a broadcast discovery whereby a message is generally transmitted to devices within a range of the primary UE 810. The discovery may include peer-to-peer beacons and/or signals. The message may include information indicating clone pairing capabilities. In such instances, devices that can perform clone pairing may respond. Although shown as discovering a single secondary UE in FIG. 8, the primary UE 810 may discover two or more secondary UEs with which it could establish a clone pairing. The secondary UE 820 may be within the same cell as the primary UE 810. In some instances, the secondary UE 820 and the primary UE 810 can be served by different TRPs within the cell.

The primary UE 810 can collect information associated with the secondary UE 820. For example, the primary UE 810 can collect one or more of availability of the secondary UE 820 to serve as a secondary UE for the primary UE 810, recent channel quality indicator (CQI) information, precoding selection, or the like. The primary UE 810 can store the collected information associated with the secondary UE 820. The primary UE 810 can collect and store information associated with a plurality of secondary UEs 820.

After discovering the secondary UE 820, the primary UE 810 may generate pairing information at event 842. The primary UE 810 can compute a joint spectral efficiency of the primary UE 810 and the secondary UE 820 operating as a clone pair. The computation of spectral efficiency can be based on information collected associated with discovering the secondary UE in event 840. The primary UE 810 can compute an incremental spectral efficiency that can be gained due to communicating with a network system via the P2P link with the secondary UE. The incremental spectral efficiency can be computed based on a P2P link condition and one or more channel conditions of the secondary UE. The UE pairing information can include the joint spectral efficiency and/or the incremental spectral efficiency. UE pairing information can be computed for one or more additional secondary UEs. The primary UE 810 can generate a priority secondary UE list indicating an order of preference of using secondary UEs as a clone pair in cases where more than one secondary UE is available.

The pairing information can include information that can be used by the secondary UE 820 to clone the primary UE 810. The pairing information may include information identifying the primary UE 810 such as precoding information, a UE subscriber ID, or an assigned Internet Protocol (IP) address. The pairing information may include an identification of a type and/or an amount of data expected to be transmitted and/or received via the clone pairing. In some implementations, the pairing information may identify a desired active set of one or more serving nodes.

The primary UE 810 can initiate a pair request. In event 844, the primary UE 810 can transmit a pairing request to the secondary UE 820. The pairing request can include pairing information generated at event 842. In cases where multiple secondary UEs are discovered, the primary UE 810 may transmit a message to the top candidate secondary UE and wait a pre-determined period of time for an acknowledgement. The top candidate secondary UE can have the highest joint spectral efficiency with the primary UE 810 of the possible clone pairs. The primary UE 810 can prioritize candidate secondary UEs based on one or more operational characteristics of a secondary UE and/or based on one or more pairing metrics associated with the secondary UE. One or more of operational characteristics and/or one or more of the pairing metrics described in association with the secondary UE 820 determining whether to accept the request can be used by the primary UE 810 in prioritizing candidate secondary UEs. If an acknowledgement is not received from the top candidate secondary UE, the primary UE 810 can continue to the next candidate in the priority peer list until an acknowledgement is received. If no acknowledgement is received from any candidate secondary UE, the message flow 800 can terminate and/or start over.

In event 846, the secondary UE 820 can determine whether to accept the clone pairing request. The determination may include evaluating the type and/or amount of data expected via the clone pairing. The determination may compare the expectations to the resources needed by secondary UE 820 to support its own operations. The determination may include detecting an operational characteristic of the secondary UE 820 such as power level (e.g., battery power), processor load, memory, applications executing on the secondary UE 820, existing clone pairings with other UEs, MIMO capabilities, traffic state of the secondary UE 820 (e.g., whether the secondary UE 820 is idle or actively communicating with the network system 830), a channel condition associated with the secondary UE 820, or another detectable operational metric for the secondary UE 820. In some implementations, the operational characteristic may be compared to a threshold and if the characteristic satisfies the threshold, the determination may indicate the secondary UE 820 is able to establish clone pairing with the primary UE 810. In certain applications, a plurality of operational characteristics can each be compared to a respective threshold, and the determination of whether to accept a clone pairing request can be based on the comparisons. The determination can be made based on some or all of the operational characteristics satisfying respective thresholds.

The determination can be based on one or more of a variety of factors. For example, the determination can be based on one or more pairing metrics. Example pairing metrics include one or more lists associated with a user equipment such as a social network list, one or more a priori agreements, or incentives such as tokens provided for serving in a clone pair. Example incentives include cellular data allowance transfer from the primary UE, digital cash, or credit tokens associated with a social network service. In response to determining to establish a clone pair, the secondary UE 820 can send a confirmation to the primary UE 810 at event 848. If the pairing request is not granted by the secondary UE 820, the primary UE 810 can send a pairing request to the next highest secondary UE on the priority list.

In response to the secondary UE 820 confirming the paring request at event 848, the primary UE 810 and the secondary UE 820 can establish a clone pair. A P2P link can be established between the primary UE 810 and the secondary UE 820. The primary UE 810 can request CQI and/or precoding information from the secondary UE 820. The secondary UE 820 can estimate its own cellular channel information and provide the cellular channel information, such as channel state quality and/or channel noise estimates, to the primary UE 810 via the P2P link.

Unlike message flows in the examples of FIGS. 6 and 7, the message flow 800 does not include generating and providing a joint channel report because the primary UE 810 and the secondary UE 820 can retain their identities from the perspective of the network system 830. Instead, in event 850, the primary UE 810 requests a tunnel from the network system 830 through the secondary UE 820 to the primary UE 810. The tunnel can be a DC tunnel in accordance with a DC tunnel protocol. The tunnel request can include information identifying the primary UE 810 and the secondary UE 820. In some instances, the tunnel request can include security information for establishing the tunnel such as encryption information for data communicated via the tunnel.

In event 852, the network system 830 can determine whether to establish the tunnel. If the network system 830 determines to establish the tunnel, the network system 830 can set up the tunnel. Because the network system 830 can detect conditions of the network which are not accessible to the primary UE 810, the network system 830 can use the additional information to determine whether and/or how to tunnel with the primary UE 810. The determination may include identifying the mobility of secondary UE 820. The network system 830 can use a criterion based on a set of metrics of the primary UE 810, the secondary UE 820, or/or other UEs served by the network system 830. The metrics can include a device mobility state, a Doppler estimate, a measure of the network-to-UE channel matrix condition such as Eigen-value spread, a network congestion measure (e.g., network load), the like, or any suitable combination thereof. One or more metrics can be modified to be consistent with the available P2P information exchange bandwidth.

If the network system 830 determines not to establish the tunnel, the message flow 800 can terminate and/or start over. In such instances, the network system 830 may transmit a message to the primary UE 810 declining the tunneling request.

In the message flow 800 shown in FIG. 8, a first part of a tunnel is established through the secondary UE 820 for the network system 830 to communicate with the primary UE 810. The network system 830 establish the tunnel to the secondary UE 820 at event 854. This can involve communicating tunneling information to the secondary UE 820. The tunneling information may include an identifier for the primary UE 810. In some implementations, the tunneling information may include a security token and/or other authentication information to verify the tunnel as being performed by one or more parties authorized by the network system 830.

A second part of the tunnel can be established between the primary UE 810 and the secondary UE 820 in event 856. The second part of the tunnel may be established over a peer-to-peer air interface for relatively short distance communications such as Bluetooth or another standardized or proprietary local area network protocol. In some implementations, establishing of the tunnel may be achieved according to an LTE dual-connectivity protocol, an LTE-Wi-Fi offload protocol, a LTE direct protocol, or another suitable standardized or proprietary network tunneling protocol.

Once the tunnel is established from the network system 830 to the primary UE 810, the secondary UE 820 can pass along downlink communications received via the tunnel to the primary UE 810 and uplink communications received via the tunnel to the network system 830. Communications between the secondary UE 820 and the network system 830 can be over a cellular link while the communications between the secondary UE 820 and the primary UE 810 can be via the peer-to-peer air interface. Accordingly, the secondary UE 820 can use different communication technologies for communicating with the primary UE 810 and the network system 830. Alternatively or additionally, the secondary UE 820 can use different communication frequencies for communicating with the primary UE 810 and the network system 830.

The primary UE 810 may aggregate first cellular data received directly from the network system 830 with second data received from the secondary UE 820 via the tunnel.

The primary UE 810 may determine to tear down the tunnel in response to detecting changed conditions. For example, the primary UE 810 may detect channel degradation of secondary UE 820 and/or a change of state (e.g., traffic state change, low battery) for the secondary UE 820. In some implementations, the primary UE 810 may tear down an established tunnel when a more efficient secondary UE is detected. In such instances, the primary UE 810 may tear down the established tunnel before setting up a new tunnel, such as via one or more of the messages shown in the message flow 800.

Providing Different Spatial Beams to UEs of a Clone Pair

In certain embodiments, a secondary UE of a clone pair can wirelessly communicate with different beams and/or TRPs of a network system than a primary UE of the clone pair. This can enable the clone pair to communicate with the network system at a higher data rate and/or with higher MIMO rank than the primary UE is able to communicate with the network system operating alone. Any suitable principles and advantages disclosed herein can be applied to using different spatial beams from a network system to communicate with a clone pair. The primary UE and the secondary UE can communicate with the same serving node via respective different beams to thereby increase a data rate and/or MIMO rank.

Figure 9A:
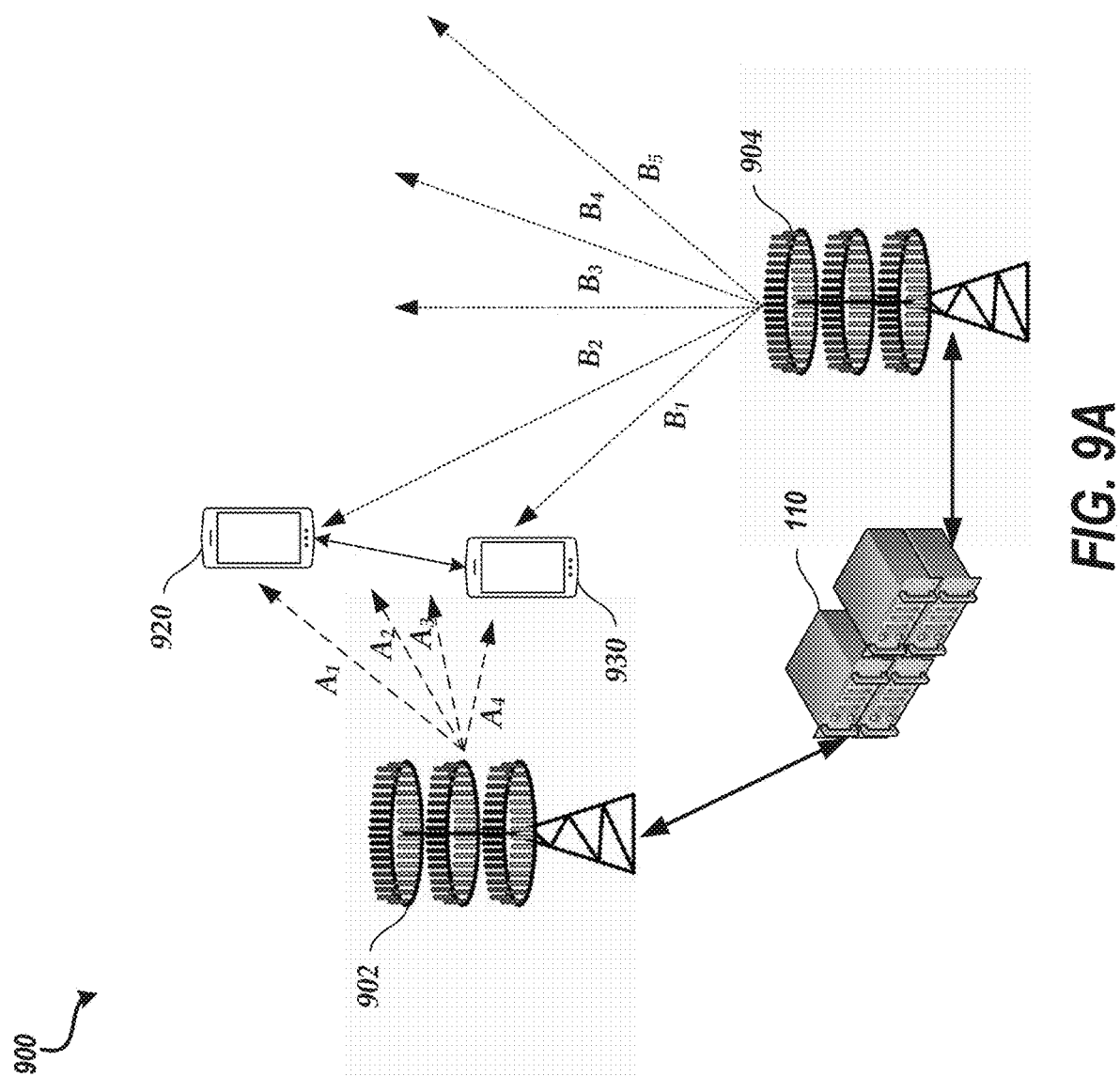
FIG. 9A illustrates an example MIMO communications environment in which different beams from the same serving node are transmitted to different UEs of a pair of UEs in communication via a P2P link according to an embodiment.

FIG. 9A illustrates an example MIMO communications environment 900 in which different beams from the same serving node are transmitted to different UEs of a pair of UEs in communication via a P2P link. The illustrated MIMO communication environment 900 includes a BBU 110, a first RRU 902, a second RRU 904, a primary UE 920, and a secondary UE 930.

The first RRU 902 can transmit a plurality of spatial beams, such as the illustrated beams $A_1$, $A_2$, $A_3$, and $A_4$. Similarly, the second RRU 904 can transmit a plurality of spatial beams, such as the illustrated beams $B_1$, $B_2$, $B_3$, $B_4$, and $B_5$. The primary UE 920 and the secondary UE 930 can each receive different beams from the first RRU 902 and the second RRU 904. For example, the primary UE 920 can receive beams $A_1$ and $B_2$ and the secondary UE 930 can receive beams $A_4$ and $B_1$. Accordingly, beams can be spatially multiplexed to communicate with the primary UE 920 and the secondary UE 930. This can enable the primary UE 920 and the secondary UE 930 to receive data associated with the primary UE 920 over different spatial beams. The secondary UE 930 can provide data received for the primary UE 920 to the primary UE 920 over a P2P link. Cellular communications with the primary UE 920 and the secondary UE 930 using different spatial beams can increase the data rate and/or rank of data associated with the primary UE 920 being transmitted by the network system.

Similar principles and advantages can be applied to using different spatial beams for transmitting uplink data associated with the primary UE 920 using the primary UE 920 and the secondary UE 930.

Figure 9B:
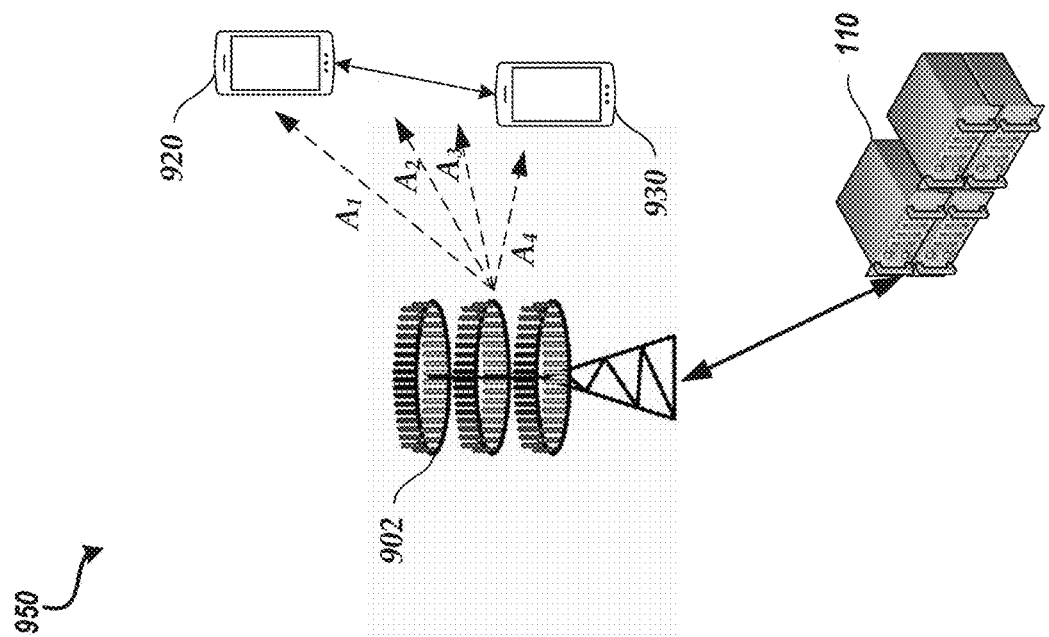
FIG. 9B illustrates an example MIMO communications environment in which different beams from the same serving node are transmitted to different UEs of a pair of UEs in communication via a P2P link according to another embodiment.

FIG. 9B illustrates an example MIMO communications environment 950 in which different beams from a single serving node are transmitted to different UEs of a pair of UEs in communication via a P2P link. The illustrated MIMO communication environment 950 includes a BBU 110, an RRU 902, a primary UE 920, and a secondary UE 930. FIG. 9B illustrates that different beams of a single TRP can serve paired UEs. The primary UE 920 and the secondary UE 930 can each receive different beams from the RRU 902. Each of the paired UEs can receive a single beam in certain instances. As illustrated, the primary UE 920 can receive beam $A_1$ from the RRU 902 and the secondary UE 930 can receive beam $A_4$ from the RRU 902. The secondary UE 930 can provide data received for the primary UE 920 to the primary UE 920 over a P2P link. Then the received data associated with beams $A_1$ and $A_4$ can be aggregated by the primary UE 902. Similar principles and advantages can be applied to using different spatial beams for transmitting uplink data associated with the primary UE 920 using the primary UE 920 and the secondary UE 930.

Methods of Wireless Communication with Clone Pair

Figure 10A:
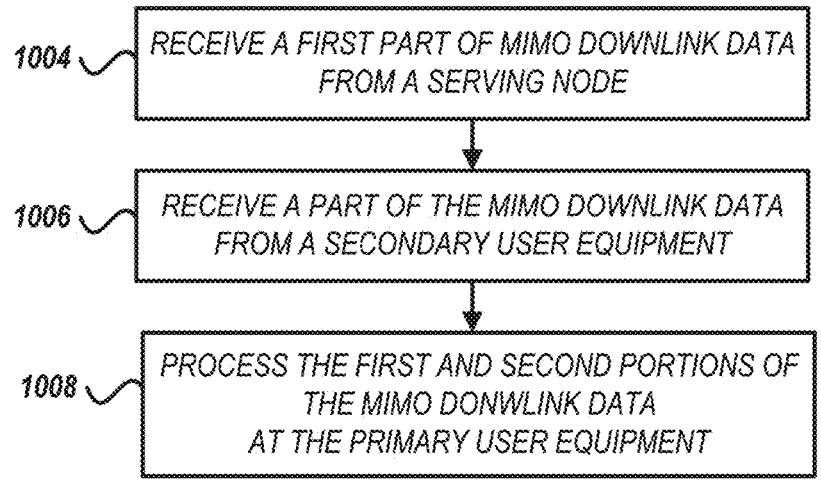
FIG. 10A is a flow diagram illustrating an example method of processing downlink data by a primary user equipment according to an embodiment.

FIG. 10A is a flow diagram illustrating an example method 1000 of processing downlink data by a primary user equipment according to an embodiment. The method 1000 can be performed by any suitable UE disclosed herein. Any suitable principles and advantages associated with the message flow diagrams of FIGS. 6 to 8 can be implemented in the method 1000. The method 1000 relates to aspects of a primary UE processing MIMO data received from a serving node and a secondary UE.

At block 1004, a first part of the MIMO downlink data transmission from one or more serving nodes is received by the primary UE. The first part of the MIMO downlink data transmission can be received by one or more antennas of the primary UE. The first part of the MIMO downlink transmission can be received via a cellular link. A second part of the MIMO downlink data transmission can be received from a secondary UE using a peer-to-peer wireless interface at block 1006. The part of the MIMO downlink data transmission can be received by a non-cellular communication over a P2P communication channel between the primary UE and the secondary UE.

The primary UE can process the first part of the MIMO communication together with the second part of the MIMO communication at block 1008. The primary UE can include one or more antennas configured to receive MIMO downlink data at up to a downlink peak data rate. The processing at block 1008 can be performed such that the MIMO downlink data transmission is processed at a higher data rate than the downlink peak data rate. The primary UE can include antennas configured to receive MIMO downlink data at up to a rank of N, wherein N is a positive integer 2 or greater. The first and second parts of downlink MIMO data transmission can together have a rank of greater than N. Accordingly, the processing at block 1008 can involve processing a downlink MIMO data transmission having a rank of greater than N.

Figure 10B:
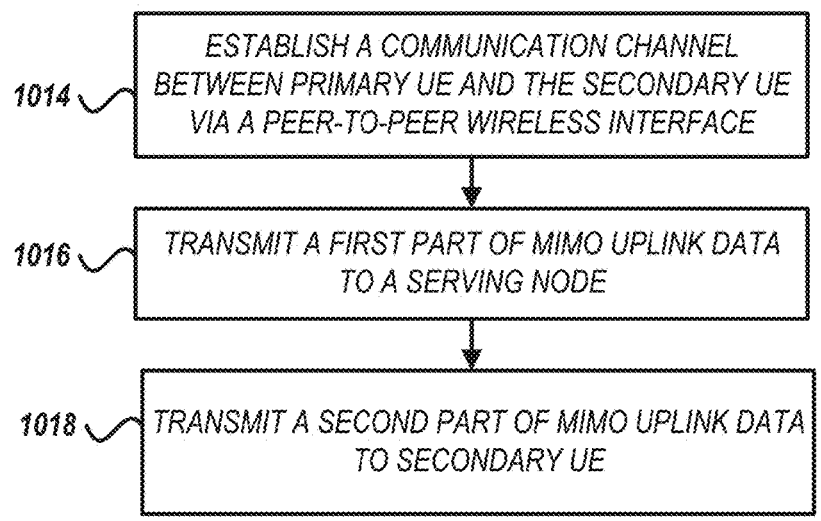
FIG. 10B is a flow diagram illustrating an example method of transmitting uplink data by a primary user equipment according to an embodiment.

FIG. 10B is a flow diagram illustrating an example method 1010 of transmitting uplink data by a primary user equipment according to an embodiment. The method 1010 can be performed by any suitable UE disclosed herein. Any suitable principles and advantages associated with the message flow diagrams of FIGS. 6 to 8 can be implemented in the method 1010. The method 1010 relates to aspects of a primary UE transmitting MIMO data to both a serving node and a secondary UE. Any suitable features of the method 1010 can be implemented in combination with any principles and advantages of the method 1000 of FIG. 10A.

At block 1014, a communication channel is established between a primary UE and the secondary UE. The communication channel can be established via a peer-to-peer wireless interface of the primary UE. Non-cellular communications can be transmitted and received over the communication channel. The primary UE can transmit a first part of MIMO uplink data to one or more serving nodes at block 1016. The transmission to the one or more serving nodes can be a cellular communication. The first part of the MIMO uplink data can be transmitted while the primary UE is in communication with the secondary UE via the communication channel established at block 1014. The primary UE can also transmit a second part of the MIMO uplink data to a secondary UE over the communication channel with the secondary UE at block 1018. The transmission to the secondary UE can be a non-cellular communication. The secondary UE can then transmit the second part to the MIMO uplink data to one or more serving nodes.

The method 1010 can enable the primary UE to transmit uplink data to a network system at a higher data rate and/or higher MIMO rank. The primary UE can include one or more antennas configured to transmit MIMO downlink data at up to an uplink peak data rate. The transmissions at blocks 1016 and 1018 can be performed such that the primary UE effectively transmits MIMO uplink data transmission to a network system at a higher data rate than the uplink peak data rate. The primary UE can include antennas configured to transmit MIMO downlink data at up to a rank of N, wherein N is a positive integer 1 or greater. The transmissions at blocks 1016 and 1018 can be performed such that the primary UE effectively transmits uplink MIMO data a rank of greater than N.

Figure 11A:
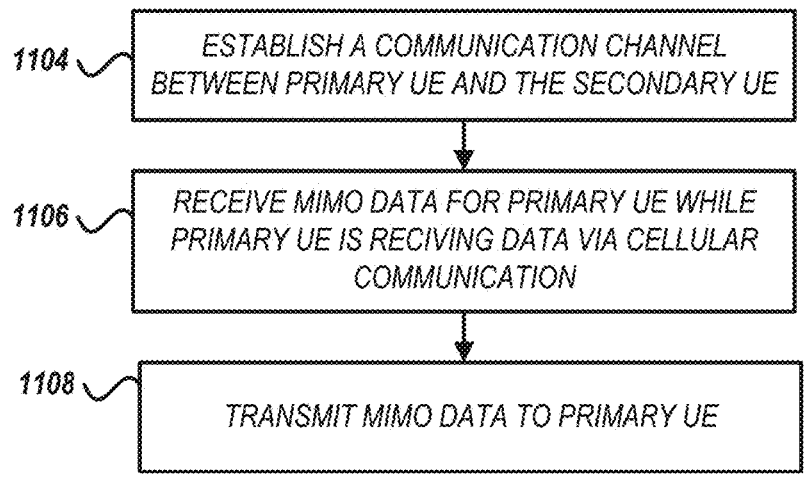
FIG. 11A is a flow diagram illustrating an example method of processing downlink data by a secondary user equipment according to an embodiment.

FIG. 11A is a flow diagram illustrating an example method 1100 of processing downlink data by a secondary user equipment according to an embodiment. The method 1100 can be performed by any suitable UE disclosed herein. Any suitable principles and advantages associated with the message flow diagrams of FIGS. 6 to 8 can be implemented in the method 1100. The method 1100 relates to aspects of a secondary UE receiving MIMO data for a primary UE and transmitting the MIMO data to the primary UE.

At block 1104, a communication channel is established between a primary UE and the secondary UE. The communication channel can be established via a peer-to-peer wireless interface of the secondary UE. Non-cellular communications can be transmitted and received over the communication channel. While the primary UE is receiving first MIMO downlink data for the primary UE via a cellular communication, the secondary UE can receive second MIMO downlink data for the primary UE at block 1106. The secondary UE can receive the second MIMO downlink data via a cellular communication. At block 1108, the secondary UE can transmit the second MIMO downlink data to the primary UE via the communication channel.

The primary user equipment can receive downlink MIMO data at up to a maximum first UE rank via cellular communications, and the first MIMO downlink data and the second MIMO downlink data can are together be included in a MIMO downlink data transmission having a rank that is higher than the maximum first UE rank. The secondary user equipment can receive downlink MIMO data at up to a maximum second UE rank via cellular communications, and the first MIMO downlink data and the second MIMO downlink data can together be included in a MIMO downlink data transmission having a rank that is higher than the maximum second UE rank.

In certain instances, the method 1100 can include generating symbol level data from the second MIMO downlink data received at block 1106. In such instances, the second MIMO downlink data transmitted at block 1108 can include the symbol level data.

In some instances, the method 1100 can include sending MIMO physical layer information to the primary user equipment over the communication channel. The method 1100 can alternatively or additionally include determining to accept a pairing request from the primary user equipment based on an operational characteristic of the secondary user equipment, and wherein the establishing is in response to the determining.

Figure 11B:
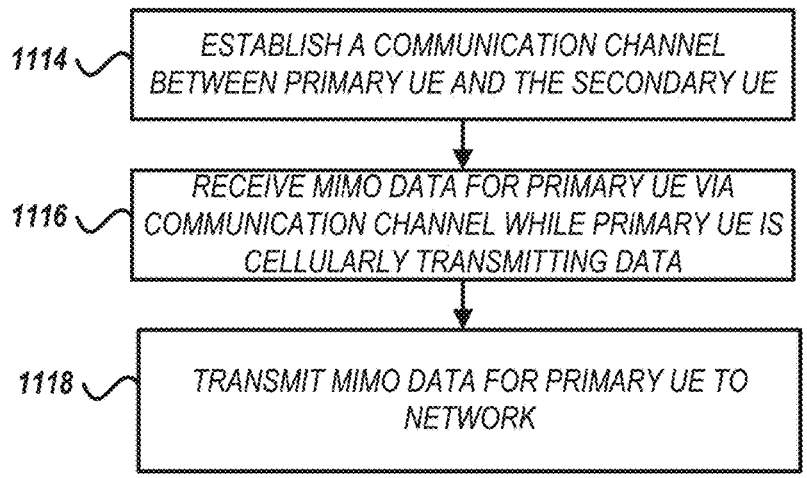
FIG. 11B is a flow diagram illustrating an example method of processing uplink data by a secondary user equipment according to an embodiment.

FIG. 11B is a flow diagram illustrating an example method 1110 of processing uplink data by a secondary user equipment according to an embodiment. The method 1110 can be performed by any suitable UE disclosed herein. Any suitable principles and advantages associated with the message flow diagrams of FIGS. 6 to 8 can be implemented in the method 1110. The method 1110 relates to aspects of a secondary UE receiving MIMO data from a primary UE and transmitting the MIMO data to a network system. Any suitable features of the method 1110 can be implemented in combination with any principles and advantages of the method 1100 of FIG. 11A.

At block 1114, a communication channel is established between a primary UE and the secondary UE. The communication channel can be established via a peer-to-peer wireless interface of the secondary UE. In certain applications, non-cellular communications can be transmitted and received over the communication channel. Cellular communications can be transmitted and received over the communication channel in some applications. While the primary UE is transmitting first MIMO uplink data for the primary UE to a network system via a cellular communication, the secondary UE can receive second MIMO uplink data from the primary UE via the communication channel at block 1116. At block 1118, the secondary UE can transmit the second MIMO uplink data to the network system.

The primary user equipment can transmit uplink MIMO data at up to a maximum first UE rank via cellular communications, and the first MIMO uplink data and the second MIMO uplink data can are together be included in a MIMO uplink data transmission having a rank that is higher than the maximum first UE rank. The secondary user equipment can transmit uplink MIMO data at up to a maximum second UE rank via cellular communications, and the first MIMO uplink data and the second MIMO uplink data can together be included in a MIMO downlink data transmission having a rank that is higher than the maximum second UE rank.

In certain instances, the method 1110 can include generating higher level data from symbol level data received at block 1116. In such instances, the second MIMO uplink data receive and transmitted at blocks 1116 and 1118, respectively, can include the different level data.

Figure 12A:
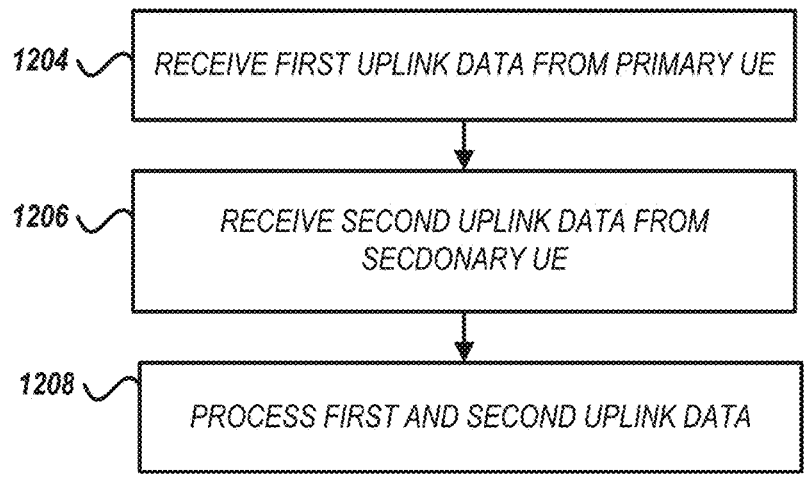
FIG. 12A is a flow diagram illustrating an example method of processing uplink data by a network system according to an embodiment.

In some instances, the method 1110 can include sending MIMO physical layer information to the primary user equipment over the communication channel. The method 1110 can alternatively or additionally include determining to accept a pairing request from the primary user equipment based on an operational characteristic of the secondary user equipment, and wherein the establishing is in response to the determining FIG. 12A is a flow diagram illustrating an example method 1200 of processing uplink data by a network system according to an embodiment. The method 1200 can be performed by any suitable network system disclosed herein. Any suitable principles and advantages associated with the message flow diagrams of FIGS. 6 to 8 can be implemented in the method 1200. The method 1200 relates to aspects of a network system processing uplink MIMO data associated with a primary UE, in which the uplink MIMO data is received from the primary UE and a secondary UE.

At block 1204, a first uplink data transmission associated with a primary user equipment from the primary user equipment can be received by a network system. The primary user equipment is configured to transmit uplink data at a rate of up to a peak uplink data rate. The network system can receive a second uplink data transmission associated with the primary user equipment from a secondary user equipment at block 1206. The network system can process data associated with the first and second uplink data transmissions at block 1208. The processing at block 1208 can be performed so as to process uplink data associated with the primary UE at a rate of greater than the peak uplink data rate of the primary UE.

Figure 12B:
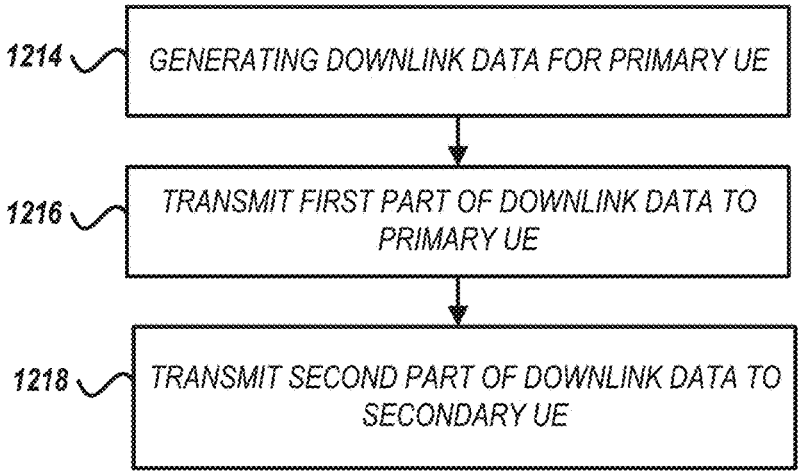
FIG. 12B is a flow diagram illustrating an example method of transmitting downlink data by a network system according to an embodiment.

FIG. 12B is a flow diagram illustrating an example method 1210 of transmitting downlink data by a network system according to an embodiment. The method 1210 can be performed by any suitable network system disclosed herein. Any suitable principles and advantages associated with the message flow diagrams of FIGS. 6 to 8 can be implemented in the method 1210. The method 1210 relates to aspects of a network system transmitting downlink MIMO data associated with a primary UE to the primary UE and a secondary UE. Any suitable features of the method 1210 can be implemented in combination with any principles and advantages of the method 1200 of FIG. 12A.

At block 1214, the network system can generate downlink transmission data for a primary UE. The network system can transmit parts of the downlink data transmission for the primary UE to the primary UE and the secondary UE while the primary UE and the secondary UE are in communication with each other via a P2P link. The network system can transmit a first part of the downlink transmission data for the primary user equipment to the primary user equipment at block 1216. This can occur while the primary user equipment is in communication with a secondary user equipment via the P2P link. The network system can transmit a second part of the downlink transmission data for the primary user equipment to the secondary user equipment at block 1218. This can occur while the primary user equipment is in communication with a secondary user equipment via the P2P link.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network system for wirelessly communicating multiple-input multiple-output (MIMO) data with a plurality of wireless communication devices, the network system comprising:
   one or more serving nodes; and
   a base band unit in communication with the one or more serving nodes, the base band unit configured to cause the one or more serving nodes to:
      wirelessly transmit a first part of a downlink MIMO data transmission associated with a primary wireless communication device to the primary wireless communication device, wherein the first part of the downlink MIMO data transmission has a rank of N, and wherein the downlink MIMO data transmission has a rank of greater than N; and
      wirelessly transmit a second part of the downlink MIMO data transmission associated with the primary wireless communication device to a secondary wireless communication device.

2. The network system of claim 1, wherein the base band unit is configured to cause a tunnel to be established between the network system and the primary wireless communication device via the secondary wireless communication device, and wherein the base band unit is configured to cause the one or more serving nodes to wirelessly transmit the second part of the downlink MIMO data transmission via the tunnel.

3. The network system of claim 1, wherein the base band unit is configured to cause the one or more serving nodes to wirelessly transmit the downlink MIMO data transmission based at least partly on a joint channel report associated with the primary wireless communication device and the secondary wireless communication device.

4. The network system of claim 1, wherein the rank of the downlink MIMO data transmission is a sum of the rank of the first part of the downlink MIMO data transmission and a rank of the second part of the downlink MIMO data transmission.

5. The network system of claim 1, wherein the one or more serving nodes comprise a first serving node and a second serving node, the base band unit is configured to cause the first serving node to wirelessly transmit the first part of the downlink MIMO transmission, and the base band unit is configured to cause the second serving node to wirelessly transmit the second part of the downlink MIMO transmission.

6. The network system of claim 5, wherein the base band unit is configured to determine that the second serving node is unavailable for wirelessly transmitting any of the downlink MIMO data transmission to the primary wireless communication device.

7. The network system of claim 1, wherein the base band unit is configured to cause a single serving node of the one or more serving nodes to wirelessly transmit both the first and second parts of the downlink MIMO transmission.

8. The network system of claim 1, wherein the base band unit is configured to:
   determine to pair the primary wireless communication device and the secondary wireless communication device for coordinated reception of downlink data; and
   based on the determining, cause a pairing command to be transmitted to at least one of the primary wireless commination device or the secondary wireless communication device.

9. A method of wirelessly communicating multiple-input multiple-output (MIMO) data, the method comprising:
   wirelessly transmitting, from a network system, a first part of a downlink MIMO data transmission associated with a primary wireless communication device to the primary wireless communication device, wherein the first part of the downlink MIMO data transmission has a rank of N, and wherein the downlink MIMO data transmission has a rank of greater than N; and
   wirelessly transmitting, from the network system, a second part of the downlink MIMO data transmission associated with the primary wireless communication device to a secondary wireless communication device.

10. The method of claim 9, further comprising establishing a tunnel between the network system and the primary wireless communication device via the secondary wireless communication device, wherein the second part of the downlink MIMO data transmission is transmitted via the tunnel.

11. The method of claim 9, further comprising:
   receiving, by the network system, a joint channel report associated with the primary wireless communication device and the secondary wireless communication device; and determining, by the network system, to wirelessly transmit the first part of the downlink MIMO data to the primary wireless communication device and wirelessly transmit the second part of the downlink MIMO data transmission to the secondary wireless communication device.

12. The method of claim 9, wherein the first part of the downlink MIMO data is transmitted from a first serving node and the second part of the downlink MIMO data transmission is transmitted from a second serving node.

13. The method of claim 9, wherein the first and second parts of the downlink MIMO data are transmitted from a single serving node.

14. The method of claim 9, further comprising:
determining to pair the primary wireless communication device and the secondary wireless communication device for coordinated reception of downlink data; and
based on the determining, transmitting a pairing command to at least one of the primary wireless commination device or the secondary wireless communication device.

15. The method of claim 9, further comprising:
receiving, by the network system, a first part of an uplink MIMO data transmission associated with the primary wireless communication device from the primary wireless communication device;
receiving, by the network system, a second part of the uplink MIMO data transmission associated with the primary wireless communication device from the secondary wireless communication device; and
jointly processing data associated with the first and second parts of the uplink MIMO data transmission.

16. A network system for wirelessly communicating multiple-input multiple-output (MIMO) data with a plurality of wireless communication devices, the network system comprising:

one or more serving nodes configured to:
receive a first part of an uplink MIMO data transmission associated with a primary wireless communication device from the primary wireless communication device; and
receive a second part of the uplink MIMO data transmission associated with the primary wireless communication device from a secondary wireless communication device; and
a base band unit in communication with the one or more serving nodes, the base band unit configured to jointly process data associated with the first part of the uplink MIMO data transmission and the second part of the uplink MIMO data transmission.

17. The network system of claim 16, wherein the first part of the uplink MIMO data transmission has a rank of N, and the uplink MIMO data transmission has a rank of greater than N.

18. The network system of claim 16, wherein the first part of the uplink MIMO data transmission has a rank of N, the uplink MIMO data transmission has a rank of N, and the first and second parts of the uplink MIMO data transmission provide transmit diversity.

19. The network system of claim 16, wherein the base band unit is configured to cause a tunnel to be established between the network system and the primary wireless communication device via the secondary wireless communication device, and wherein the second part of the uplink MIMO data transmission is received via the tunnel.

20. The network system of claim 16, wherein the first and second parts of the uplink MIMO data transmission are part of a single-user MIMIO operation.

* * * * *